United States Patent
Du

(10) Patent No.: US 11,284,380 B2
(45) Date of Patent: Mar. 22, 2022

(54) METHOD, DEVICE, SYSTEM AND STORAGE MEDIUM FOR TRANSMITTING UPLINK CONTROL INFORMATION

(71) Applicant: China Academy of Information and Communications Technology, Beijing (CN)

(72) Inventor: Ying Du, Beijing (CN)

(73) Assignee: China Academy of Information and Communications Technology, Beijing (CN)

( * ) Notice: Subject to any disclaimer, the term of this patent is extended or adjusted under 35 U.S.C. 154(b) by 40 days.

(21) Appl. No.: 16/876,207

(22) Filed: May 18, 2020

(65) Prior Publication Data

US 2020/0288459 A1    Sep. 10, 2020

Related U.S. Application Data

(63) Continuation of application No. PCT/CN2017/117403, filed on Dec. 20, 2017.

(51) Int. Cl.
*H04W 72/04* (2009.01)
*H04B 7/06* (2006.01)
(Continued)

(52) U.S. Cl.
CPC ...... *H04W 72/0413* (2013.01); *H04B 7/0626* (2013.01); *H04L 1/1819* (2013.01);
(Continued)

(58) Field of Classification Search
CPC ......... H04W 72/0413; H04W 72/0453; H04W 72/0493; H04W 72/12; H04B 7/0626;
(Continued)

(56) References Cited

U.S. PATENT DOCUMENTS

2010/0278109 A1    11/2010    Papasakellariou et al.
2017/0048026 A1    2/2017    Park et al.
(Continued)

FOREIGN PATENT DOCUMENTS

CN    102412880 A    4/2012
CN    103733550 A    4/2014
(Continued)

OTHER PUBLICATIONS

Written Opinion of the International Searching Authority for related International Patent Application No. PCT/CN2017/117403, filed Dec. 20, 2017.
(Continued)

*Primary Examiner* — Hassan Kizou
*Assistant Examiner* — Mahbubul Bar Chowdhury
(74) *Attorney, Agent, or Firm* — Burris Law, PLLC

(57) ABSTRACT

The application provides a method, device, system and storage medium for transmitting Uplink Control Information (UCI). The method includes: a user terminal determines a first resource, in which the first resource is adopted by the user terminal to transmit a Physical Uplink Shared Channel (PUSCH), and the first resource includes $N_{RB}^{PUSCH}$ Resource Blocks (RBs) in a frequency domain; the user terminal transmits first UCI on a second resource, in which the second resource belongs to the first resource; the second resource includes $N_{RE}^{UCI}$ Resource Elements (REs), the $N_{RE}^{UCI}$ REs include $N_{RE\_SET}^{UCI}$ RE sets and $N_{RE\_SEP}^{UCI}$ REs, each of the $N_{RE\_SET}^{UCI}$ RE sets includes $N_{RB}^{PUSCH}$ REs, and REs with adjacent frequencies of the $N_{RB}^{PUSCH}$ REs are separated by $N_{SC}^{RB}$ subcarriers. By adopting the method, performance for transmitting the UCI on the PUSCH resource may be improved.

17 Claims, 9 Drawing Sheets

(51) Int. Cl.
  *H04L 1/18* (2006.01)
  *H04L 5/00* (2006.01)
  *H04L 5/10* (2006.01)

(52) U.S. Cl.
  CPC .......... *H04L 5/0051* (2013.01); *H04L 5/0055* (2013.01); *H04L 5/10* (2013.01); *H04W 72/0453* (2013.01); *H04W 72/0493* (2013.01)

(58) Field of Classification Search
  CPC ....... H04L 1/1819; H04L 1/18; H04L 5/0051; H04L 5/0055; H04L 5/10; H04L 5/00
  See application file for complete search history.

(56) References Cited

U.S. PATENT DOCUMENTS

| | | | |
|---|---|---|---|
| 2018/0110041 A1* | 4/2018 | Bendlin | H04L 5/0051 |
| 2018/0167931 A1* | 6/2018 | Papasakellariou | H04L 1/1887 |
| 2019/0159194 A1* | 5/2019 | Huang | H04L 5/0057 |
| 2019/0199477 A1* | 6/2019 | Park | H04L 1/0067 |
| 2020/0068556 A1* | 2/2020 | Tiirola | H04L 5/0053 |
| 2020/0077370 A1* | 3/2020 | Qu | H04L 5/0007 |
| 2020/0244499 A1* | 7/2020 | Yoshioka | H04W 72/04 |
| 2020/0245320 A1* | 7/2020 | Yoshioka | H04L 5/0053 |

FOREIGN PATENT DOCUMENTS

| | | |
|---|---|---|
| CN | 104125040 A | 10/2014 |
| CN | 104301082 A | 1/2015 |
| CN | 107005374 A | 8/2017 |
| CN | 107241802 A | 10/2017 |

OTHER PUBLICATIONS

Chinese Office Action dated Mar. 3, 2020 for corresponding Chinese Application No. 201711142918.X, filed Nov. 17, 2017 is provided, along with an English-language translation of the Office Action.

* cited by examiner

|    |              | first RE set | Second RE set | third RE set | Fourth RE set | Fifth RE set | Sixth RE set | Seventh RE set | Eighth RE set | Ninth RE set | Tenth RE set | Eleventh RE set | Twelfth RE set |
|----|--------------|--------------|---------------|--------------|---------------|--------------|--------------|----------------|---------------|--------------|--------------|-----------------|----------------|
| RB | subcarrier 1 | ▓ | | | | | | | | | | | |
|    | subcarrier 2 | | ▓ | | | | | | | | | | |
|    | subcarrier 3 | | | ▓ | | | | | | | | | |
|    | subcarrier 4 | | | | ▓ | | | | | | | | |
|    | subcarrier 5 | | | | | ▓ | | | | | | | |
|    | subcarrier 6 | | | | | | ▓ | | | | | | |
|    | subcarrier 7 | | | | | | | ▓ | | | | | |
|    | subcarrier 8 | | | | | | | | ▓ | | | | |
|    | subcarrier 9 | | | | | | | | | ▓ | | | |
|    | subcarrier 10 | | | | | | | | | | ▓ | | |
|    | subcarrier 11 | | | | | | | | | | | ▓ | |
|    | subcarrier 12 | | | | | | | | | | | | ▓ |
| RB | subcarrier 13 | ▓ | | | | | | | | | | | |
|    | subcarrier 14 | | ▓ | | | | | | | | | | |
|    | subcarrier 15 | | | ▓ | | | | | | | | | |
|    | subcarrier 16 | | | | ▓ | | | | | | | | |
|    | subcarrier 17 | | | | | ▓ | | | | | | | |
|    | subcarrier 18 | | | | | | ▓ | | | | | | |
|    | subcarrier 19 | | | | | | | ▓ | | | | | |
|    | subcarrier 20 | | | | | | | | ▓ | | | | |
|    | subcarrier 21 | | | | | | | | | ▓ | | | |
|    | subcarrier 22 | | | | | | | | | | ▓ | | |
|    | subcarrier 23 | | | | | | | | | | | ▓ | |
|    | subcarrier 24 | | | | | | | | | | | | ▓ |

FIG.4

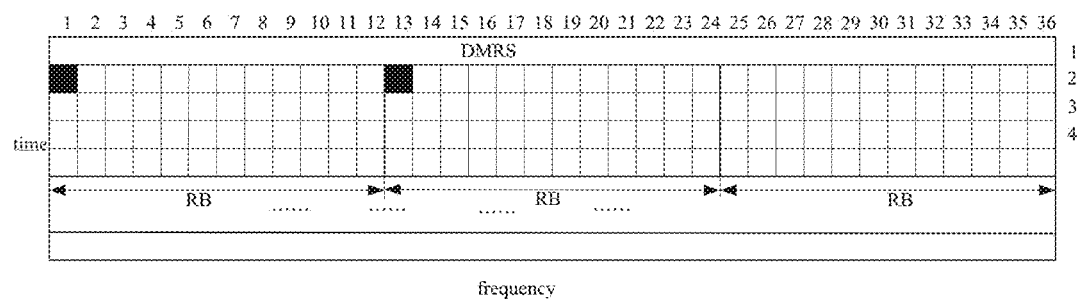

METHOD, DEVICE, SYSTEM AND STORAGE MEDIUM FOR TRANSMITTING UPLINK CONTROL INFORMATION

CROSS-REFERENCE TO RELATED APPLICATIONS

This is a continuation of International (PCT) Application No. PCT/CN2017/117403 filed Dec. 20, 2017, which claims the benefit of Chinese Patent Application No. 201711142918.X filed Nov. 17, 2017. The disclosure of each of the above-identified applications is incorporated by reference as if fully set forth herein in its entirety.

FIELD

The present disclosure relates to communication technologies, and more particularly, to a method, device, system and storage medium for transmitting Uplink Control Information (UCI).

BACKGROUND

With the continuous development of social economy as well as science and technology, mobile communication technology has also made rapid progress and development.

A New Radio (NR) technology will enable the next generation of wireless communication system to have a higher frequency utilization and energy efficiency, communication security and user experience will also be significantly improved. The NR technology will support three types of communication services, such as, an Enhanced Mobile Broadband (eMBB), an Ultra Reliable Low Latency Communications (URLLC) and a massive Machine Type Communication (mMTC).

In the NR/Long Term Evolution (LTE) system, a user terminal reports UCI information to a network device, and the UCI information is taken as a basis for the network device to schedule downlink data transmission, or uplink data transmission of the user terminal.

If the network device transmits downlink service data via a Physical Downlink Shared Channel (PDSCH), after receiving the information service data, the user terminal feeds back, via a Physical Uplink Control Channel (PUCCH) or a Physical Uplink Shared Channel (PUSCH), ACK information or NACK information about the reception of the downlink service data, such that the network device may determine whether to re-schedule the downlink service data, or schedule new downlink service data for the user terminal.

The ACK information and the NACK information are collectively called Hybrid automatic repeat request acknowledgement (HARQ-ACK). In addition to the HARQ-ACK, the UCI information may further include Channel State Information (CSI), Rank Indication (RI) and so on. The CSI includes at least one of a Channel Quality Indicator (CQI), a Precoding Matrix Indicator (PMI), a CSI-RS Resource Indicator (CRI), a Precoding Type Indicator (PTI), or a Beam management Index (BMI). The CSI information is configured to transmit downlink channel information to the network device by the user terminal, such that the network device may schedule the downlink data of the user terminal. Scheduling Request (SR) information is configured to request the network device by the user terminal, such that the network device may schedule uplink channel resources for the user terminal to transmit uplink data.

In the LTE system, PUSCH resources are composed of an integer number of physical resource block groups (PRB-pair). One PRB-pair includes two PRBs. In the frequency domain, one PRB includes 12 sub-carriers. In the time domain, one PRB includes one Slot. Each slot includes 7 symbols. For the two Slots of one PRB-pair, a middle symbol of each Slot is configured to transmit a Demodulation Reference Signal (DMRS) by the user terminal.

When the user terminal transmits the UCI via the PUSCH channel, the UCI has higher performance requirements. More particularly, the transmission reliability of the HARQ-ACK information in the UCI has a great influence on the transmission efficiency of downlink data. Thus, the HARQ-ACK is important information in the UCI.

Secondly, RI information contents in the UCI are relevant with resources occupied by the CSI information in the PUSCH. That is, the user terminal detects the RI, and determines the resources occupied by the CSI information in the PUSCH based on the RI value. Thus, the RI information is also important information in the UCI information.

In the LTE system, taking into account that channel estimation performance of resources closer to the DMRS is better, important UCI information is mapped to the adjacency of the DMRS, so as to achieve the required performance.

SUMMARY

This section provides a general summary of the disclosure, and is not a comprehensive disclosure of its full scope or all of its features. The disclosure provides a method, a device, a system and a storage medium for transmitting Uplink Control Information (UCI).

In one form, the present disclosure provides a method for transmitting Uplink Control Information (UCI), including: determining, by a user terminal, a first resource, wherein the first resource is adopted by the user terminal to transmit a Physical Uplink Shared Channel (PUSCH), and the first resource includes $N_{RB}^{PUSCH}$ Resource Blocks (RBs) in a frequency domain; transmitting, by the user terminal, first UCI on a second resource, wherein the second resource belongs to the first resource, the second resource includes $N_{RE}^{UCI}$ Resource Elements (REs), the $N_{RE}^{UCI}$ REs include $N_{RE\_SET}^{UCI}$ RE sets and $N_{RE\_SEP}^{UCI}$ REs, each of the $N_{RE\_SET}^{UCI}$ RE sets includes $N_{RB}^{PUSCH}$ REs, and REs with adjacent frequencies of the $N_{RB}^{PUSCH}$ REs are separated by $N_{SC}^{RB}$ subcarriers; wherein $N_{RE\_SET}^{UCI}$ and $N_{RE\_SET}^{UCI}$ are integers not less than 0, $N_{RE\_SEP}^{UCI} < N_{RB}^{PUSCH}$, $N_{RE}^{UCI}$ and $N_{RB}^{PUSCH}$ are integers greater than 0, $N_{SC}^{RB}$ is the number of subcarriers in one RB of the frequency domain.

In another form, the present disclosure provides a method for transmitting UCI, including: determining, by a network device, a first resource, wherein the first resource is adopted by the network device to receive a PUSCH, and the first resource includes $N_{RB}^{PUSCH}$ RBs in a frequency domain; receiving, by the network device, first UCI on a second resource, wherein the second resource belongs to the first resource; wherein the second resource includes $N_{RE}^{UCI}$ REs, the $N_{RE}^{UCI}$ REs include $N_{RE\_SET}^{UCI}$ RE sets and $N_{RE\_SEP}^{UCI}$ REs, each of the $N_{RE\_SET}^{UCI}$ RE sets includes $N_{RB}^{PUSCH}$ REs, and REs with adjacent frequencies of the $N_{RB}^{PUSCH}$ REs are separated by $N_{SC}^{RB}$ subcarriers; $N_{RE}^{UCI}$, $N_{RE\_SET}^{UCI}$ and $N_{RE\_SEP}^{UCI}$ are integers not less than 0, $N_{RE\_SEP}^{UCI} < N_{RB}^{PUSCH}$, $N_{RB}^{PUSCH}$ is an integer greater than 0, $N_{SC}^{RB}$ is the number of subcarriers included by one RB in the frequency domain.

In yet another form, the present disclosure provides a device for transmitting UCI, applied to a user terminal, including: one or more memories; one or more processors; wherein the one or more memories store one or more instruction modules, which are executed by the one or more processors after being configured, and the one or more instruction modules include: a determining unit, configured to determine a first resource, wherein the first resource is adopted by a user terminal to transmit a PUSCH, and the first resource includes $N_{RB}^{PUSCH}$ RBs in a frequency domain; and, a transceiver unit, configured to transmit first UCI on a second resource, wherein the second resource belongs to the first resource, the second resource includes $N_{RE}^{UCI}$ REs, the $N_{RE}^{UCI}$ REs include $N_{RE\_SET}^{UCI}$ RE sets and $N_{RE\_SEP}^{UCI}$ REs, each of the $N_{RE\_SET}^{UCI}$ RE sets includes $N_{RB}^{PUSCH}$ REs, and REs with adjacent frequencies of the $N_{RB}^{PUSCH}$ REs are separated by $N_{SC}^{RB}$ subcarriers; wherein $N_{RE\_SET}^{UCI}$ and $N_{RE\_SEP}^{UCI}$ are integers not less than 0, $N_{RE\_SEP}^{UCI} < N_{RB}^{PUSCH}$, $N_{RE}^{UCI}$ and $N_{RB}^{PUSCH}$ are integers greater than 0, $N_{SC}^{RB}$ is the number of subcarriers in one RB of the frequency domain.

In still another form, the present disclosure provides a device for transmitting UCI, applied to a network device, including: one or more memories; one or more processors; wherein the one or more memories store one or more instruction modules, which are executed by the one or more processors after being configured, and the one or more instruction modules include: a determining unit, configured to determine a first resource, wherein the first resource is adopted by the network device to receive a PUSCH, and the first resource includes $N_{RB}^{PUSCH}$ RBs in a frequency domain; and, a receiving unit, configured to receive first UCI on a second resource, wherein the second resource belongs to the first resource, the second resource includes $N_{RE}^{UCI}$ REs, the $N_{RE}^{UCI}$ REs include $N_{RE\_SET}^{UCI}$ RE sets and $N_{RE\_SEP}^{UCI}$ REs, each of the $N_{RE\_SET}^{UCI}$ RE sets includes $N_{RB}^{PUSCH}$ REs, and REs with adjacent frequencies of the $N_{RB}^{PUSCH}$ REs are separated by $N_{SC}^{RB}$ subcarriers; wherein $N_{RE}^{UCI}$, $N_{RE\_SET}^{UCI}$ and $N_{RE\_SEP}^{UCI}$ are integers not less than 0, $N_{RE\_SEP}^{UCI} < N_{RB}^{PUSCH}$, $N_{RB}^{PUSCH}$ are integers greater than 0, $N_{SC}^{RB}$ is the number of subcarriers in one RB of the frequency domain.

In still another form, the present disclosure provides a system for transmitting UCI, including a user terminal and a network device, wherein the user terminal is configured to determine a first resource, wherein the first resource is adopted by the user terminal to transmit a PUSCH, the first resource includes $N_{RB}^{PUSCH}$ RBs in a frequency domain; the user terminal is further configured to transmit first UCI on a second resource, wherein the second resource belongs to the first resource; the network device is configured to determine the first resource, wherein the first resource is adopted by the network device to receive the PUSCH, the first resource includes $N_{RB}^{PUSCH}$ RBs in the frequency domain; the network device is further configured to receive the first UCI on the second resource, and the second resource belongs to the first resource; wherein the second resource includes $N_{RE}^{UCI}$ REs, the $N_{RE}^{UCI}$ REs include $N_{RE\_SET}^{UCI}$ RE sets and $N_{RE\_SEP}^{UCI}$ REs, each of the A $N_{RE\_SET}^{UCI}$ RE sets includes $N_{RB}^{PUSCH}$ REs, and REs with adjacent frequencies of the $N_{RB}^{PUSCH}$ REs are separated by $N_{SC}^{RB}$ subcarriers; $N_{RE}^{UCI}$, $N_{RE\_SET}^{UCI}$ and $N_{RE\_SEP}^{UCI}$ are integers not less than 0, $N_{RE\_SEP}^{UCI} < N_{RB}^{PUSCH}$, $N_{RB}^{PUSCH}$ is an integer greater than 0, $N_{SC}^{RB}$ is the number of subcarriers in one RB of the frequency domain.

In a further form, the present disclosure provides a non-transitory storage medium, which stores computer readable instructions, that when executed by at least one processor, causing the at least one processor to perform the foregoing method.

DRAWINGS

The drawings described herein are for illustrative purposes only of selected embodiments and not all possible implementations, and are not intended to limit the scope of the present disclosure.

FIG. 4 is a schematic diagram illustrating a transmission position of the UCI in a frequency domain, in accordance with an embodiment of the application.

FIG. 5 is a schematic diagram illustrating resources occupied when transmitting the UCI in an example, in which $N_{RB}^{PUSCH}=3$ and $N_{RE}^{UCI}=2$.

Corresponding reference numerals indicate corresponding parts throughout the several views of the drawings.

DETAILED DESCRIPTION

To make objectives, technical solutions and advantages of the application more clear, detailed descriptions of the application will be provided in the following, accompanying with attached figures and embodiments. It should be understood that, the specific embodiments described herein are only for the purpose of explaining the application, instead of limiting the application.

Figure 1:
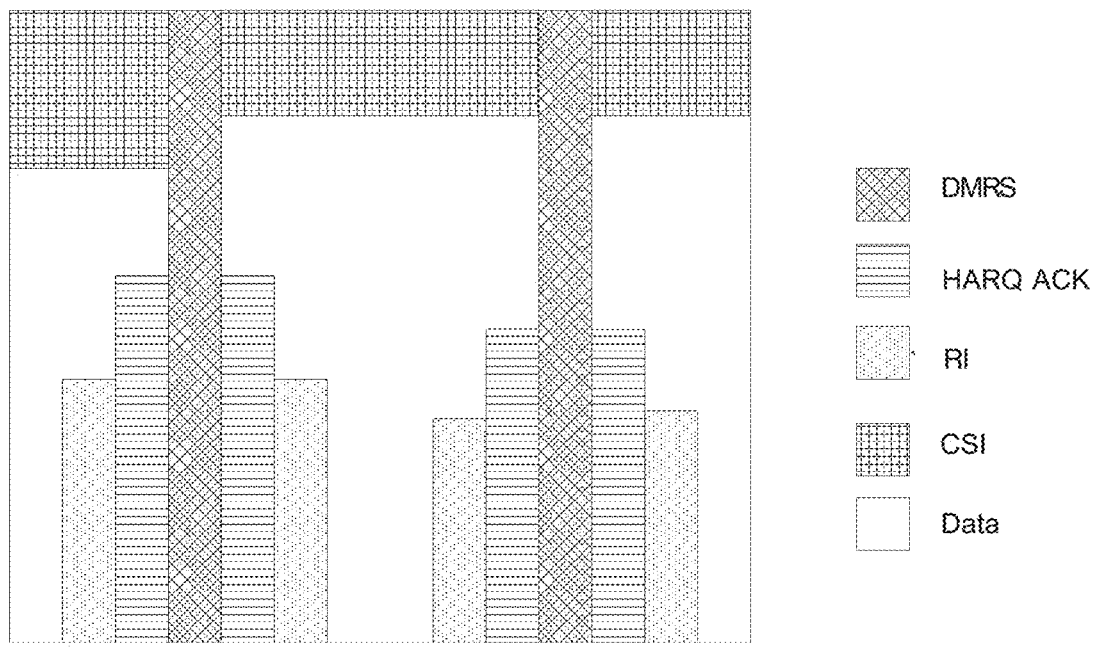
FIG. 1 is a schematic diagram illustrating a resource mapping in the LTE system, when UCI is transmitted via a PUSCH.

With reference to FIG. 1, FIG. 1 is a schematic diagram illustrating a resource mapping in the LTE system, when UCI is transmitted via a PUSCH. In FIG. 1, HARQ-ACK occupies 4 symbols adjacent to both sides of two DMRS symbols in the PUSCH. RI occupies 4 symbols with a distance of 1 symbol to two DMRS symbols in the PUSCH. Subsequently, demodulation performances of the HARQ-ACK and RI in the network device are guaranteed. Compared with the HARQ-ACK and RI, the demodulation performance of CSI information may be lower. Subsequently, the CSI information may occupy resources of each symbol in the PUSCH.

In the NR system, the DMRS symbol is a front symbol of the PUSCH resources, so as to improve data demodulation speed of an Uplink Shared Channel (UL-SCH) performed by the network device, and reduce buffer space requirements of the network device. In this case, there are less resources adjacent to resources occupied by the DMRS signal. How to ensure the performance for transmitting UCI information on PUSCH resources in the NR system is a problem that the existing implementation has not solved.

In a method for transmitting Uplink Control Information (UCI), the position for transmitting the UCI on PUSCH resources is respectively given in the frequency domain and time domain. By adopting the solution of the application, performance and delay requirements of UCI information transmitted on PUSCH resources may be improved.

Transmission process of the UCI is described in the following, by using the position information, respectively provided in the frequency domain and time domain, for transmitting the UCI on PUSCH resources.

A First Embodiment

Figure 2:
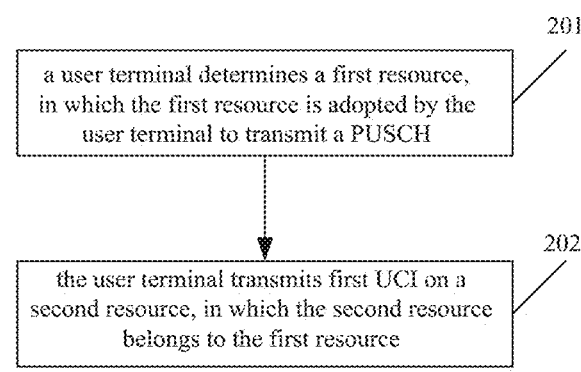
FIG. 2 is a flowchart illustrating a method for transmitting the UCI, in accordance with an embodiment of the application.

With reference to FIG. 2, FIG. 2 is a flowchart illustrating a method for transmitting UCI, in accordance with a first embodiment of the application. The specific blocks are as follows.

In block 201, a user terminal determines a first resource, in which the first resource is configured to transmit a PUSCH by the user terminal.

The first resource includes $N_{RB}^{PUSCH}$ Resource Blocks (RBs) in the frequency domain.

The user terminal determines the first resource. The first resource is configured by a network device for the user terminal to transmit a PUSCH, or scheduled by the network device for the user terminal to transmit the PUSCH. For example, PUSCH resource is allocated by the network device for the user terminal through a PUCCH, or allocated by the network device for the user terminal with high-layer signaling.

In block 202, the user terminal transmits first UCI on a second resource, in which the second resource belongs to the first resource.

In the block, first Uplink Control Information is denoted as first UCI. The first UCI includes any one of, or any combination of HARQ-ACK, CSI or CRI. And, the CSI includes at least one of CQI, PMI, CRI, PTI, BMI.

The second resource includes $N_{RE}^{UCI}$ Resource Elements (REs). The $N_{RE}^{UCI}$ REs include $N_{RE\_SET}^{UCI}$ RE sets and $N_{RE\_SEP}^{UCI}$ REs. Each of the $N_{RE\_SET}^{UCI}$ RE sets includes $N_{RB}^{PUSCH}$ REs. Among the $N_{RB}^{PUSCH}$ REs, REs with adjacent frequencies are separated by $N_{SC}^{RB}$ subcarriers.

$N_{RE\_SET}^{UCI}$ and $N_{RE\_SEP}^{UCI}$ are both integers not less than 0. $N_{RE\_SEP}^{UCI} < N_{RB}^{PUSCH}$. $N_{RE}^{UCI}$ and $N_{RB}^{PUSCH}$ are integers greater than 0. $N_{SC}^{RB}$ denotes the number of subcarriers included by an RB in the frequency domain.

For the convenience of description, different expressions are given for $N_{RE}^{UCI}$, $N_{RE\_SET}^{UCI}$, $N_{RE\_SEP}^{UCI}$ and $N_{RB}^{PUSCH}$, by respectively adopting superscript and subscript, so as to represent different numbers, and to denote that there is no difference from using N, M or other identifying letters. $N_{RE}^{UCI}$ represents the number of REs for transmitting the first UCI. $N_{RE\_SET}^{UCI}$ represents the number of RE sets for transmitting the first UCI. Among the REs for transmitting the first UCI, $N_{RE\_SEP}^{UCI}$ represents REs in addition to the $N_{RE\_SET}^{UCI}$ RE sets. $N_{RB}^{PUSCH}$ represents the number of RBs for transmitting the PUSCH.

Generally speaking, the user terminal transmits the UCI in a PUCCH channel.

Within a PUCCH duration, if the user terminal is simultaneously scheduled to transmit a PUSCH channel, the PUCCH channel and PUSCH are not continuous in the frequency domain, the user terminal transmits the PUCCH channel and the PUSCH channel at the same time, subsequently, the user terminal has a lower power efficiency.

If the PUCCH channel and the PUSCH channel are relatively far apart in frequency, there may also be inter-modulation interference between them.

Thus, in addition to the PUCCH channel, the user terminal may also transmit the UCI information to the network device via a PUSCH channel.

Within a duration for transmitting the UCI information, if the user terminal is scheduled to transmit the PUSCH channel, meanwhile the user terminal does not support to simultaneously transmit the PUCCH channel and the PUSCH channel, the user terminal may only transmit the UCI through the PUSCH channel.

When the user terminal does not support to simultaneously transmit the PUCCH channel and the PUSCH channel, there may be two cases as follows. In a first case, the capability of the user terminal may not support to simultaneously transmit the PUCCH channel and the PUSCH channel. In a second case, the network device may indicate, through configuration information, that the user terminal is not allowed to simultaneously transmit the PUSCH and PUCCH.

The PUSCH includes a UL-SCH, and/or, the UCI transmitted by the user terminal, or a DMRS signal for demodulating the UL-SCH and/or the UCI.

The UL-SCH includes uplink service data information transmitted to the network device by the user terminal.

When the user terminal transmits the UCI on the PUSCH resources, resources for transmitting the UCI on the PUSCH resources need to be determined in a pre-defined way. The user terminal transmits the UCI on these resources. Correspondingly, the network device also receive and detect the UCI on these resources, based on the pre-defined method.

In the embodiment, resources for transmitting the UCI by the user terminal in the first resource are the second resource. The second resource includes $N_{RE}^{UCI}$ REs. The $N_{RE}^{UCI}$ REs include $N_{RE\_SET}^{UCI}$ sets and $N_{RE\_SEP}^{UCI}$ REs. Each RE set of the $N_{RE\_SET}^{UCI}$ RE sets includes $N_{RB}^{PUSCH}$ REs. And, among the $N_{RB}^{PUSCH}$ REs, REs with adjacent frequencies are separated by $N_{SC}^{RB}$ subcarriers. $N_{RE\_SET}^{UCI}$ and $N_{RE\_SEP}^{UCI}$ are both integers not less than 0. $N_{RE\_SEP}^{UCI} < N_{RB}^{PUSCH}$. $N_{RE}^{UCI}$ and $N_{RB}^{PUSCH}$ are both integers greater than 0. $N_{SC}^{RB}$ represents the number of subcarriers included by one RB in the frequency domain.

Taking the 5G NR system as an example, length of a wireless frame in the system is 10 ms, which includes 10 subframes. The system at least supports 6 kinds of numerology as shown in Table 1 as follows.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Each numerology configuration μ corresponds to a sub-carrier spacing size, a cyclic prefix size, the number $N_{slot}^{subframe,\mu}$ of Slots within one subframe, and so on.

The numerology configuration u, used by the system, is informed by the network device to the user terminal with high-layer signaling.

Figure 3:
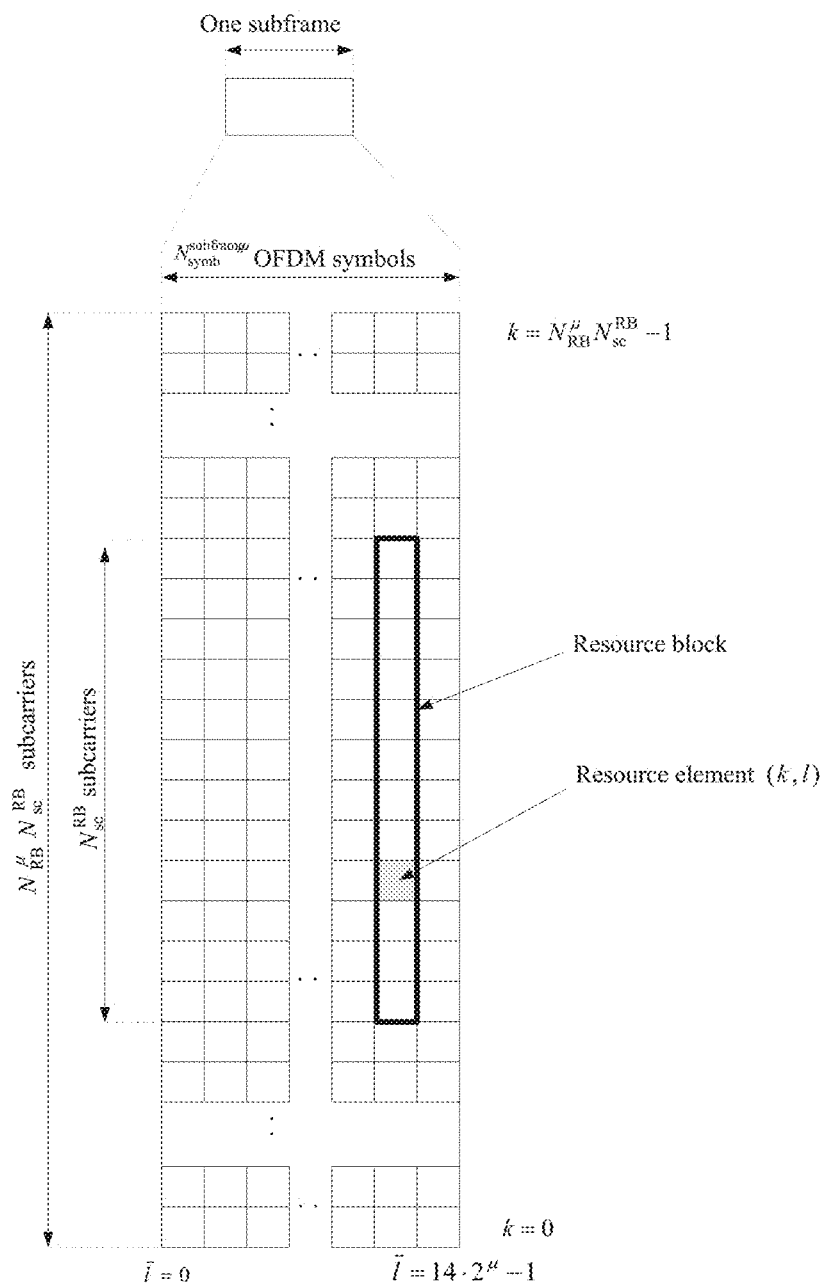
FIG. 3 illustrates a corresponding relationship between numerology configuration μ and carrier related information.

With reference to FIG. 3, FIG. 3 illustrates a corresponding relationship between numerology configuration μ and carrier related information. In FIG. 3, according to the numerology configuration μ used by a cell, one RE includes one subcarrier in the frequency domain, and includes one symbol in the time domain. An index of one RE is (k,l), in which k=0, . . . , $N_{RB}^{\mu} N_{sc}^{RB}-1$ is an index of the RE within current uplink bandwidth (denoted with the number $N_{RB}^{\mu}$ of RBs included by the uplink bandwidth) of the frequency domain, l represents a symbol position index of the RE in the time domain. One PRB includes $N_{sc}^{RB}$ consecutive subcarriers in frequency. In the NR system, $N_{sc}^{RB}=12$. In other system, the value of $N_{sc}^{RB}$ is determined by the other system. The index $n_{PRB}$ of an RB located by the RE with resource index (k,l) meets the following condition:

$$n_{PRB} = \left\lfloor \frac{k}{N_{sc}^{RB}} \right\rfloor.$$

The first resource used by the user terminal to transmit the PUSCH includes $N_{RB}^{PUSCH}$ RBs in the frequency domain, indexes of which are respectively 0, 1, . . . $N_{RB}^{PUSCH}-1$ according to the ascending order of frequency. Each RB includes $N_{sc}^{RB}$ consecutive subcarriers. The second resource for transmitting the first UCI includes $N_{RE\_SET}^{UCI}$ RE sets. Each of the $N_{RE\_SET}^{UCI}$ RE sets includes $N_{RB}^{PUSCH}$ REs. Besides, for the $N_{RB}^{PUSCH}$ REs, REs with adjacent frequencies are separated by $N_{SC}^{RB}$ subcarriers. Thus, it can be seen that $N_{RE}^{UCI}=N_{RE\_SET}^{UCI} \times N_{RB}^{PUSCH}+N_{RE\_SEP}^{UCI}$.

In the specific implementations, there may be the following methods to transmit the UL-SCH information.

The UL-SCH information transmitted by the user terminal on the first resource is information after punching to the second resource, or after performing a rate matching on the second resource.

Taking $N_{sc}^{RB}=12$ in the NR system as an example, resources of each symbol in the first resource are divided into 12 RE sets. Each RE set includes $N_{RB}^{PUSCH}$ REs. The position of the RE in the $p^{th}$ RE set is $SC_p^{index}+i \cdot N_{SC}^{RB}$, in which i=0, 1, . . . $N_{RB}^{PUSCH}$. $SC_p^{index}$ is the frequency index value of an RE with the minimum frequency index in the $p^{th}$ (P≤12) RE set.

Each RE set of foregoing $N_{RE\_SET}^{UCI}$ RE sets corresponds to an RE set divided as such. That is, each RE set of foregoing $N_{RE\_SET}^{UCI}$ RE sets includes $N_{RB}^{PUSCH}$ REs. These $N_{RB}^{PUSCH}$ REs are distributed at equal intervals of $N_{SC}^{RB}$ subcarriers in frequency.

Thus, it can satisfy that frequency resources, occupied for transmitting the UCI on the PUSCH, may be spread on bandwidth occupied by the PUSCH as much as possible. Subsequently, frequency resources, occupied for transmitting the UCI on the PUSCH, are distributed in grids at equal intervals in frequency.

The NR system supports two uplink waveforms: Discrete Fourier Transform Spread Orthogonal Frequency Division Multiplexing (DFT-s-OFDM) and Cyclic Prefix Orthogonal Frequency Division Multiplexing (CP-OFDM). When adopting the DFT-S-OFDM waveform, the PUSCH data is firstly transformed to all the resources of the occupied bandwidth through a DFT conversion, i.e., information transmitted through the PUSCH may obtain a frequency diversity gain of occupied bandwidth. However, for the CP-OFDM waveform, if the UCI occupies consecutive frequency resources of the PUSCH, the UCI transmission cannot obtain a frequency diversity gain within the PUSCH transmission bandwidth. By adopting the solution of the application, no matter the PUSCH waveform adopts the OFDM or DFT-S-FDMA, the frequency diversity gain of transmission may be obtained, and transmission performance requirements of the UCI may also be satisfied.

With reference to FIG. 4, FIG. 4 is a schematic diagram illustrating a frequency-domain transmission position of the UCI, in accordance with an embodiment of the application. In FIG. 4, taking $N_{RB}^{PUSCH}=2$ in the NR system as an example, the first resource is divided into 12 RE sets within one symbol. Each RE set includes 2 REs. According to the number of the first UCI, a second resource includes one or more RE sets.

The second resource belongs to a second symbol set in the time domain. The second symbol set and the first symbol set are adjacent in time. The first symbol set includes symbols, which are adopted by the user terminal to transmit DMRS in the first resource.

When detecting the PUSCH information, according to a detection about signals received on resources with which the user terminal transmits the DMRS, the network device firstly obtains uplink channel response information on these resource positions. And then, the network device obtains, with an interpolation algorithm, uplink channel response information from other resource positions of the PUSCH, in addition to the DMRS resources.

Generally speaking, the network device may obtain more accurate uplink channel response information from resources closer to the DMRS resources. Meanwhile, demodulation performance of uplink information transmitted on these resources is better. In the PUSCH resources of the NR system, DMRS symbols are symbols in the front, so as to improve data demodulation speed of the UL-SCH by the network device, and avoid the requirements for reducing buffer space of the network device. In this case, there are less resources adjacent to the resources occupied by the DMRS signal.

For example, the DMRS signal is located in the first symbol of the PUSCH resources. Subsequently, for the PUSCH resources and before the resources occupied by the DMRS signal, there is no resource for transmitting the UCI. That is, resources with excellent channel estimation performance, that are available for the DMRS resources, are reduced.

Foregoing second resource belongs to the second symbol set in the time domain. The second symbol set and the first symbol set are adjacent in time. The first symbol set includes symbols in the first resource for transmitting the DMRS signal by the user terminal. It is beneficial to concentrate resources for transmitting the UCI of the PUSCH to the adjacency of the DMRS, so as to satisfy transmission performance requirements of the UCI.

For example, if the second symbol set includes P symbols, resources of the first (P−1) symbols in the second symbol set of the first resource belong to the second resource. That is, resource amount of the first symbol is not sufficient to transmit the first UCI, subsequently, the user terminal will occupy resources of the current symbol to transmit the first UCI.

In view of above, the first resource includes $N_{RB}^{PUSCH}$ RBs in frequency. Each RB includes $N_{SC}^{RB}$ consecutive subcarriers. Firstly, in the first resource, the second resource for transmitting the first UCI tries to occupy symbols closer to DMRS. Secondly, the second resource includes $N_{RE\_SET}^{UCI}$ RE sets and $N_{RE\_SEP}^{UCI}$ REs. Each RE set includes REs, which are distributed at equal intervals of the frequency width of $N_{SC}^{RB}$ subcarriers in frequency. $N_{RE\_SEP}^{UCI} < N_{RB}^{PUSCH}$. The $N_{RE\_SEP}^{UCI}$ REs are also distributed at equal intervals of s subcarriers in frequency.

For example, if $N_{RE}^{UCI} < N_{RB}^{PUSCH}$, $N_{RE\_SET}^{UCI} = 0$, $N_{RE\_SEP}^{UCI} = N_{RE}^{UCI}$. That is, the number of REs needed for transmitting the first UCI is less than that of the RBs included by the first resource. Subsequently, the number of REs included by the second resource is less than that of the REs included by one RE set. The second resource with $N_{RE\_SEP}^{UCI}$ REs is sufficient.

Optionally, the $N_{RE\_SEP}^{UCI}$ REs are also distributed at equal intervals of $N_{SC}^{RB}$ subcarriers in frequency.

Furthermore, the $N_{RE\_SEP}^{UCI}$ REs are resources of symbols, which are adjacent to symbols for transmitting the DMRS through the PUSCH in time.

With reference to FIG. 5, FIG. 5 is a schematic diagram illustrating resources occupied for transmitting the UCI in an example, in which $N_{RB}^{PUSCH} = 3$ and $N_{RE}^{UCI} = 2$.

In the example illustrated with FIG. 5, $N_{RB}^{PUSCH} = 3$, $N_{RE}^{UCI} = 2$. That is, the first resource includes 3 RBs as shown in FIG. 5. The second resource is 2 black boxes in FIG. 5. In the example, for the $N_{RE\_SEP}^{UCI}$ REs, the position of the RE with the minimum index value is located in the RE with the lowest frequency in the first resource.

In the example, the position of the RE with the minimum index value of the $N_{RE\_SEP}^{UCI}$ REs is located in the RE with the lowest frequency of the first resource.

Optionally, the position of the RE with the minimum index value of the $N_{RE\_SEP}^{UCI}$ REs is preset, or is configured by the network device for the user terminal through first information. Based on the preset position, or the first information, as well as relative positions (REs with adjacent frequencies are separated by $N_{SC}^{RB}$ subcarriers) of the $N_{RE\_SEP}^{UCI}$ REs, the user terminal may determine the positions of the $N_{RE\_SEP}^{UCI}$ REs.

Taking FIG. 5 as an example, the position of the RE with the minimum index value of the $N_{RE\_SEP}^{UCI}$ REs, which is preset or configured with the first information, is located in the subcarrier with the lowest frequency in the frequency domain of the $N_{RB}^{PUSCH}$ RBs. Definitely, it may preset, or configure with the first information that, the position of the RE with the minimum index value of the $N_{RE\_SEP}^{UCI}$ REs is in a subcarrier with the second lowest frequency of the frequency domain $N_{RB}^{PUSCH}$, and so on. The position of the second resource may be determined, by taking such position as the starting point and the value of $N_{RE\_SEP}^{UCI}$.

If $$N_{RE}^{UCI} \geq N_{RB}^{PUSCH}, N_{RE\_SET}^{UCI} = \text{Quotient}\left(\frac{N_{RE}^{UCI}}{N_{RB}^{PUSCH}}\right),$$

-continued $$N_{RE\_SEP}^{UCI} = \text{mod}\left(\frac{N_{RE}^{UCI}}{N_{RB}^{PUSCH}}\right),$$

in which "Quotient" denotes the operation to take the quotient, and "mod" denotes the operation to take the remainder. That is, the number of REs needed for transmitting the first UCI is greater than the number of RBs in the first resource. Subsequently, the number of REs in the second resource is greater than the number of REs in one RE set. The second resource includes $N_{RE\_SET}^{UCI}$ RE sets and $N_{RE\_SEP}^{UCI}$ REs.

Furthermore and optionally, if $N_{RE}^{UCI} \leq N_{RB}^{PUSCH} \times N_{SC}^{RB}$, $N_{RE\_SET}^{UCI}$ RE sets are located within one symbol; if $N_{RE}^{UCI} > N_{RB}^{PUSCH} \times N_{SC}^{RB}$, $N_{RE\_SET}^{UCI}$ RE sets are located within $M_{symbol}^{UCI}$ symbols, in which, if $$\text{mod}\left(\frac{N_{RE}^{UCI}}{N_{RB}^{PUSCH} \times N_{SC}^{RB}}\right) = 0, M_{symbol}^{UCI} = \text{Quotient}\left(\frac{N_{RE}^{UCI}}{N_{RB}^{PUSCH} \times N_{SC}^{RB}}\right).$$

If $$\text{mod}\left(\frac{N_{RE}^{UCI}}{N_{RB}^{PUSCH} \times N_{SC}^{RB}}\right) \neq 0, M_{symbol}^{UCI} = \text{Quotient}\left(\frac{N_{RE}^{UCI}}{N_{RB}^{PUSCH} \times N_{SC}^{RB}}\right) + 1.$$

In the foregoing formula, "Quotient" denotes the operation to take the quotient, "mod" denotes the operation to take the remainder. Optionally, the $M_{symbol}^{UCI}$ symbols are consecutive in the time domain. That is, if $N_{RE\_SET}^{UCI}$ is an integer multiple of $N_{RB}^{PUSCH} \times N_{SC}^{RB}$, the second resource is all the resources of $$M_{symbol}^{UCI} = \text{Quotient}\left(\frac{N_{RE}^{UCI}}{N_{RB}^{PUSCH} \times N_{SC}^{RB}}\right)$$

symbols in the first resource.

If $N_{RE\_SET}^{UCI}$ is not the integer multiple of $N_{RB}^{PUSCH} \times N_{SC}^{RB}$, the second resource is resources within $$M_{symbol}^{UCI} = \text{Quotient}\left(\frac{N_{RE}^{UCI}}{N_{RB}^{PUSCH} \times N_{SC}^{RB}}\right) + 1$$

symbols, which includes all the resources of $$\text{Quotient}\left(\frac{N_{RE}^{UCI}}{N_{RB}^{PUSCH} \times N_{SC}^{RB}}\right)$$

symbols in the first resource, and some frequency resources of one symbol within the first resource.

Figure 6:
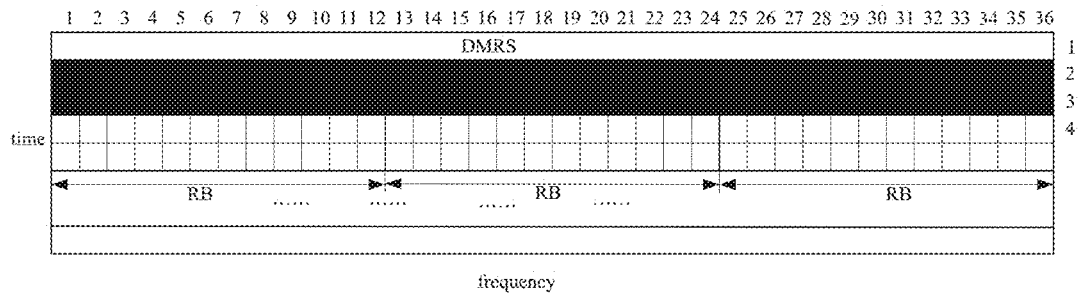
FIG. 6 is a schematic diagram illustrating resources occupied when transmitting the UCI in an example, in which $N_{RB}^{PUSCH}=3$ and $N_{RE}^{UCI}=72$.

With reference to FIG. 6, FIG. 6 is a schematic diagram illustrating resources occupied for transmitting the UCI in an example, in which $N_{RB}^{PUSCH} = 3$ and $N_{RE}^{UCI} = 72$.

In the example illustrated with FIG. 6, $N_{RB}^{PUSCH} = 3$ and $N_{RE}^{UCI} = 72$. That is, the first resource is 3 RBs in FIG. 6. The second resource is 72 black boxes in FIG. 6. The second resource is all the resources of two adjacent symbols after the DMRS symbol in the first resource.

Figure 7:
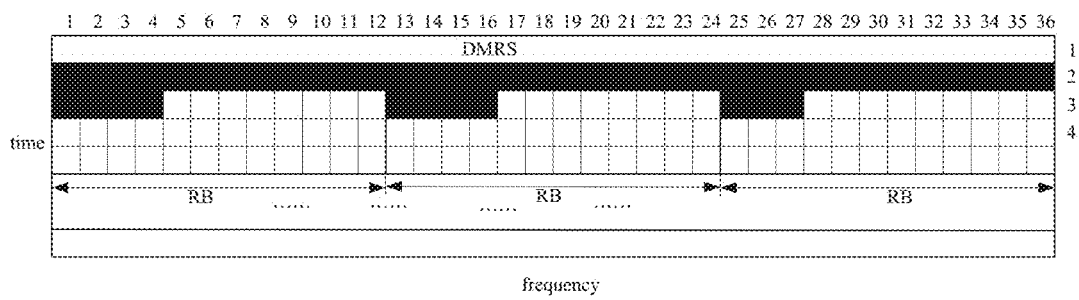
FIG. 7 is a schematic diagram illustrating resources occupied when transmitting the UCI in an example, in which $N_{RB}^{PUSCH}=3$ and $N_{RE}^{UCI}=47$.

FIG. 7 is a schematic diagram illustrating resources occupied for transmitting the UCI in an example, in which $N_{RB}^{PUSCH}=3$ and $N_{RE}^{UCI}=47$.

In the example illustrated with FIG. 7, $N_{RB}^{PUSCH}=3$ and $N_{RE}^{UCI}=47$. That is, the first resource is 3 RBs in FIG. 7. The second resource is 47 black boxes in FIG. 7. The second resource is all the resources of the first adjacent symbol after the DMRS symbol in the first resource, and some resources of the second adjacent symbol after the DMRS symbol in the first resource.

Furthermore, if the second resource includes $N_{RE\_SET\_j}^{UCI}$ RE sets on symbol j, the $N_{RE\_SET\_j}^{UCI}$ RE sets include $N_{RE\_SET\_j}^{UCI}$ REs within one RB of symbol j. The $N_{RE\_SET\_j}^{UCI}$ REs are consecutive in frequency.

Optionally, the $N_{RE\_SET\_j}^{UCI}$ REs are with the lowest frequency index in the RB, or the highest frequency index in the RB.

Alternatively and optionally, for the $N_{RE\_SET\_j}^{UCI}$ REs, a frequency sorting position thereof in the RB and a value of $N_{RE\_SET\_j}^{UCI}$ meet a preset relationship. The frequency sorting position of the RE in the RB refers to that, according to the ascending order or descending order of frequency, a corresponding RE is located in which RE of the RB. For example, the preset relationship includes:

when $N_{RE\_SET\_j}^{UCI}=1$, the frequency sorting position of $N_{RE\_SET\_j}^{UCI}$ RE set in one RB is {0};

when $N_{RE\_SET\_j}^{UCI}=2$, the frequency sorting position of $N_{RE\_SET\_j}^{UCI}$ RE sets in one RB is {0, 6};

when $N_{RE\_SET\_j}^{UCI}=3$, the frequency sorting position of $N_{RE\_SET\_j}^{UCI}$ RE sets in one RB is {0, 4, 8};

when $N_{RE\_SET\_j}^{UCI}=4$, the frequency sorting position of $N_{RE\_SET\_j}^{UCI}$ RE sets in one RB is {0, 3, 6, 9};

when $N_{RE\_SET\_j}^{UCI}=6$, the frequency sorting position of $N_{RE\_SET\_j}^{UCI}$ RE sets in one RB is {0, 2, 4, 6, 8, 10};

when $N_{RE\_SET\_j}^{UCI}=12$, the frequency sorting position of $N_{RE\_SET\_j}^{UCI}$ RE sets in one RB is {0, 1, 2, 3, 4, 5, 6, 7, 8, 9, 10, 11}.

If $N_{RE\_SEP}^{UCI}$ REs included by the second resource are located in symbol i, within the resource of symbol i in the first resource, foregoing $N_{RE\_SEP}^{UCI}$ REs of the second resource are located within $N_{RE\_SEP}^{UCI}$ RBs. For the $N_{RE\_SEP}^{UCI}$ REs, a frequency interval of REs with adjacent frequencies is $N_{SC}^{RB}$ subcarriers. If at the symbol i, in addition to the $N_{RE\_SEP}^{UCI}$ REs, no other resource belongs to the second resource, for the $N_{RE\_SEP}^{UCI}$ REs, the RE with the lowest frequency index is located in an RB with the lowest frequency index of a resource, which belongs to symbol i in the first resource. Alternatively, for the $N_{RE\_SEP}^{UCI}$ REs, the RE with the highest frequency index is located in an RB with the highest frequency index of a resource, which belongs to symbol i of the first resource. If at the symbol i, in addition to the $N_{RE\_SEP}^{UCI}$ REs, there are other RE sets of the second resource. Subsequently, within one RB of symbol i of the first resource, one RE of foregoing $N_{RE\_SEP}^{UCI}$ REs and an RE of other second resource of the RB are consecutive in the frequency domain.

Optionally, for the foregoing $N_{RE}^{UCI}$ REs, the position of the first RE with the minimum index value is preset, or is configured by the network device for the user terminal through first information. The first RE is with the minimum frequency index of the first RE set. The first RE set includes REs with the minimum time index of the $N_{RE}^{UCI}$ sets.

Foregoing first resource includes $N_{RB}^{PUSCH}$ RBs in the frequency. Each RB includes $N_{SC}^{RB}$ consecutive subcarriers. In the first resource, the second resource for transmitting the first UCI tries to occupy symbols closer to the DMRS. Secondly, the second resource includes $N_{RE\_SET}^{UCI}$ RE sets and $N_{RE\_SEP}^{UCI}$ REs. Each RE set includes REs, which are distributed at equal intervals of the frequency width of $N_{SC}^{RB}$ subcarriers in frequency, in which, $N_{RE\_SEP}^{UCI}<N_{RB}^{PUSCH}$. The $N_{RE\_SEP}^{UCI}$ REs are also distributed at equal intervals of $N_{SC}^{RB}$ subcarriers in frequency In the example, for foregoing $N_{RE}^{UCI}$ REs, the position of the first RE with the minimum index value is preset, or is configured by the network device for the user terminal through first information.

Alternatively, for foregoing $N_{RE}^{UCI}$ REs, the position of the first RE with the maximum index value is preset, or is configured by the network device for the user terminal through the first information.

If $N_{RE\_SET}^{UCI} \geq 1$, the first RE belongs to the $N_{RE\_SET}^{UCI}$ RE set. That is, in the $N_{RE\_SET}^{UCI}$ RE sets and $N_{RE\_SEP}^{UCI}$ REs included by $N_{RE}^{UCI}$ REs, among the REs with the minimum time index of REs included by $N_{RE\_SET}^{UCI}$ RE sets, the frequency of the RE with the lowest frequency index is less than the frequency of the RE with the lowest frequency index of foregoing $N_{RE\_SEP}^{UCI}$ REs.

The user terminal may determine the positions of the $N_{RE}^{UCI}$ REs, based on the preset position or first information, as well as relative positions (REs with adjacent frequencies are separated by $N_{SC}^{RB}$ subcarriers) of the $N_{RE}^{UCI}$ REs.

In foregoing embodiment, optionally, the first UCI includes at least one of HARQ-ACK and CSI. The CSI includes at least one of first-type CSI and second-type CSI. The size of the second-type CSI depends on the value of the first-type CSI. For example, the second-type CSI includes CQI, RI, and so on. The first-type CSI includes the RI. Based on a different value of the RI in the first-type CSI, the size of the second-type CSI is different. That is, the second-type CSI includes a different bit length. When RI=1, the second-type CSI includes $W_1$ bits. When RI=2, the second-type CSI includes $W_2$ bits.

If there are two, or more than two methods to transmit the first UCI on the first resource by the user terminal, the user terminal may determine the resource for transmitting the UCI by using one of the following two methods.

In a first method: the user terminal respectively assumes that foregoing first UCI is one kind of two, or more than two kinds of UCI, and respectively determines the resource within the first resource corresponding to each kind of UCI, according to the method of the application.

If the user terminal respectively determines the resource within the first resource corresponding to each kind of UCI, for the resource corresponding to each kind of UCI, the position of the first RE with the minimum index value is respectively preset for each kind of UCI, or is respectively configured by the network device for the user terminal about each kind of UCI.

In the following example, when the UCI transmitted by the user terminal on the first resource includes three kinds of control information HARQ-ACK, the first-type CSI (RI) and the second-type CSI, the situation that the user terminal determines the first resource for transmitting the UCI includes as follows.

The resources included by the first resource are numbered, according to the frequency order and time order of granularity of RE sets. That is, the numbering order is the $A^{th}$ RE set (including REs with the lowest frequency in the first symbol of each RB of the first resource), the $B^{th}$ RE set (including REs with second lowest frequency in the first symbol of each RB of the first resource), ..., the $M^{th}$ RE set (including REs with the lowest frequency in the second symbol of each RB of the first resource), and so on.

Figure 8:
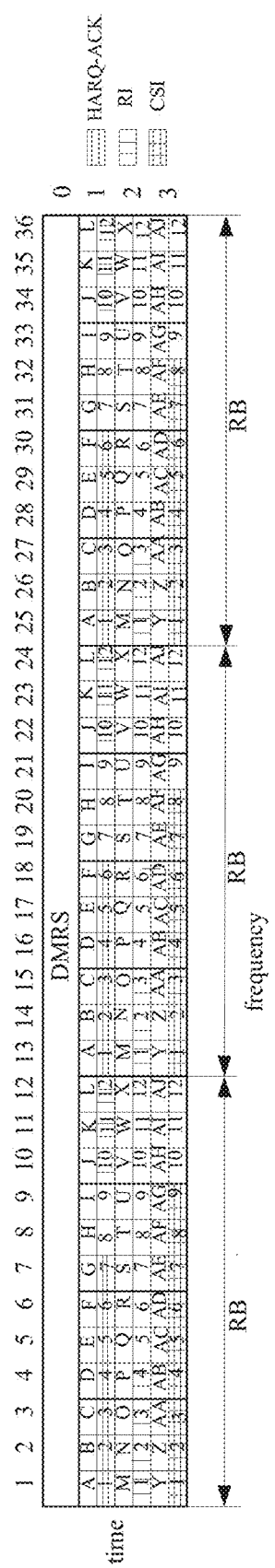
FIG. 8 is a schematic diagram illustrating a first method for determining resources to transmit the UCI in an embodiment.

With reference to FIG. 8, FIG. 8 is a schematic diagram illustrating a first method to determine the resource for transmitting the UCI, according to an embodiment.

In the example illustrated with FIG. 8, the first resource includes $N_{RB}^{PUSCH}=3$ RBs. One RE set includes 3 REs. The 3 REs are respectively located in the same position of 3 RBs included by the first resource.

For example, the RE set A includes the first RE of each first symbol in 3 RBs of the first resource, the RE set B includes the second RE of each first symbol in 3 RBs of the first resource, . . . , the RE set J includes the twelfth RE of each first symbol in 3 RBs of the first resource.

Assume that in the UCI transmitted by the user terminal, the HARQ-ACK needs to occupy 19 REs, the first-type CSI (RI) needs to occupy 16 REs, and the second-type CSI needs to occupy 26 REs of the PUSCH resource. Subsequently, according to the solution of the application, it is determined that the resource for transmitting the HARQ-ACK is 6 RE sets and 1 RE of the first resource, the resource for transmitting the first-type CSI (RI) is 5 RE sets and 1 RE of the first resource, the resource for transmitting the second-type CSI is 8 RE sets and 1 RE of the first resource.

The position of the first RE with the minimum index value of resources respectively occupied by the HARQ-ACK, the first-type CSI (RI) and the second-type CSI is preset, or is configured by the network device for the user terminal through first information.

In FIG. 8, the position of the first RE with the minimum index value of resources respectively occupied by the HARQ-ACK, the first-type CSI (RI) and the second-type CSI is the RE with the minimum frequency index of the first adjacent symbol after the symbol occupied by the DMRS, the tenth RE after the RE with the minimum frequency index of the first adjacent symbol subsequent to the symbol occupied by the DMRS, the RE with the minimum frequency index of the third adjacent symbol after the symbol occupied by the DMRS.

In a second method: for the $N_{RE}^{UCI}$ REs, the position of the first RE with the minimum index value is determined by the position of the RE included by a third resource, in which the third resource is adopted by the user terminal to transmit second UCI, and the third resource belongs to the first resource.

For the first UCI, the position of the first RE with the minimum index value in the corresponding second resource is determined by the position of the RE included by the third resource. The third resource is another kind of UCI, the second UCI, transmitted by the user terminal. The third resource belongs to the first resource. A resource-mapping priority of the second UCI in the PUSCH is higher than that of the first UCI in the PUSCH.

Figure 9:
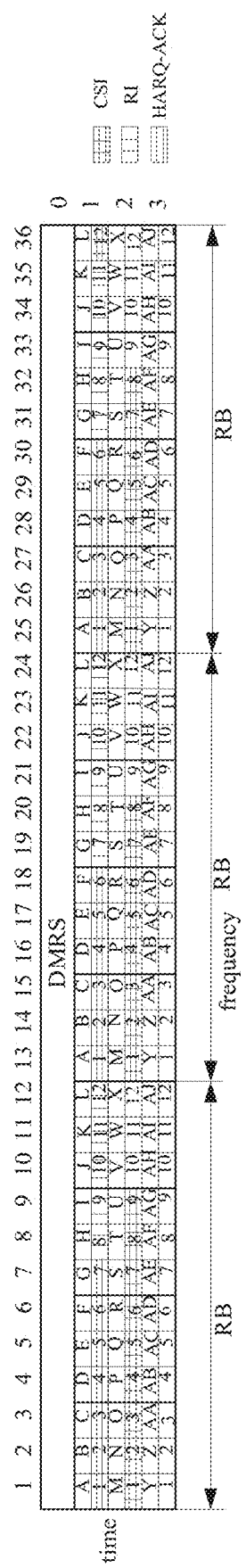
FIG. 9 is a schematic diagram illustrating a second method for determining resources to transmit the UCI in an embodiment.

With reference to FIG. 9, FIG. 9 is a schematic diagram illustrating a second method for determining the resource to transmit the UCI, according to an embodiment.

In the following example, when the UCI transmitted by the user terminal on the first resource includes three kinds of control information, the HARQ-ACK, the first-type CSI (RI) and the second-type CSI, the user terminal determines the first resource for transmitting the UCI, according to the second method.

Still in an example, in which the first resource includes $N_{RB}^{PUSCH}=3$ RBs, one RE set includes 3 REs. These 3 REs are respectively located in the same position of 3 RBs included by the first resource. For example, the RE set A includes the first RE of each first symbol in 3 RBs of the first resource, the RE set B includes the second RE of each first symbol in 3 RBs of the first resource, . . . , the RE set J includes the twelfth RE of each first symbol in 3 RBs of the first resource.

Assume that in the UCI transmitted by the user terminal, the HARQ-ACK needs to occupy 19 REs, the first-type CSI (RI) needs to occupy 19 REs, and the second-type CSI needs to occupy the PUSCH resource. Subsequently, the second resource includes 20 RE sets and 1 RE. In the second resource, firstly the resource corresponding to the HARQ-ACK information is mapped, secondly, the resource corresponding to the first-type CSI information is mapped, and finally the resource corresponding to the second-type CSI information is mapped.

In the foregoing example, the descending order of the UCI priority sequence mapped by the second resource is as follows. The priority of the HARQ-ACK is higher than that of the first-type CSI, and the priority of the first-type CSI is higher than that of the second-type CSI.

Firstly, assume that in the method of the embodiment, the first UCI is the HARQ-ACK, the resource-mapping priority of the HARQ-ACK in the PUSCH is the highest. The position of the first RE with the minimum index value of $N_{RE}^{UCI}$ REs corresponding to the HARQ-ACK is preset, or is configured by the network device for the user terminal through first information.

Subsequently, assume that the first UCI is the first-type CSI, the resource-mapping priority of the first-type CSI in the PUSCH is lower than that of the HARQ-ACK. The position of the first RE with the minimum index value of $N_{RE}^{UCI}$ REs corresponding to the first-type CSI is determined, based on the resource occupied by the HARQ-ACK in the PUSCH.

Finally, assume that the first UCI is the second-type CSI, and the resource-mapping priority of the second-type CSI in the PUSCH is lower than that of the HARQ-ACK and the first-type CSI. The position of the first RE with the minimum index value of $N_{RE}^{UCI}$ REs corresponding to the first-type CSI is determined, based on resources occupied by the HARQ-ACK and the first-type CSI in the PUSCH.

Optionally, when the user terminal determines resources respectively occupied by each kind of UCI in the PUSCH resource, the priority sequence for each kind of UCI to map resource is configured by the network device for the user terminal.

For example, the user terminal firstly maps the first-type UCI to an RE set with smaller index number, and then, maps the second-type UCI to an RE set with the second smallest index number, and so on, finally, maps the UCI with the highest mapping priority to an RE set with greater index number in the second resource.

The first-type UCI transmission has the highest reliability and delay requirements. For example, for a downlink service type 1, the first-type UCI is the HARQ-ACK. The network device needs to accurately acquire the HARQ-ACK information transmitted by the user terminal as early as possible, so as to start a preprocessing process of a downlink data transmission package in time. For a downlink service type 2, the first-type CSI information is the CSI.

The network device needs to accurately acquire the CSI information transmitted by the user terminal as early as possible, so as to effectively schedule a subsequent downlink data transmission in time. That is, for receiving time and receiving performance about different kinds of UCI, the network device has a certain expectation, based on a different kind of downlink service.

The network device informs the user terminal about the mapping order of different kinds of UCI, through high-layer signaling or physical-layer signaling, thereby facilitating the user terminal to reasonably and effectively map various kinds of UCI to the PUSCH resources. When the DMRS occupies resource earlier, transmission reliability and delay requirements about various kinds of UCI are satisfied.

More particularly, if the network device transmits to the user terminal the priority about each kind of UCI to map resource, by scheduling a Physical Downlink Control Channel (PDCCH) of the PUSCH, i.e., first indication information, for scheduling the PDCCH of the PUSCH, is a first value, the user terminal firstly maps the HARQ-ACK, and then maps the CSI; when the first indication information is a second value, the user terminal firstly maps the CSI, and then maps the HARQ-ACK.

Based on the resource-mapping priority of the UCI in the PUSCH, resources occupied by the UCI in the PUSCH are determined. When there is no UCI type information with a higher resource-mapping priority in the PUSCH, UCI type information with a lower priority may be transmitted on resources closer to the DMRS, such that the transmission reliability of the UCI may be guaranteed.

A Second Embodiment

Applying to a network device, so as to implement a UCI transmission process.

Figure 10:
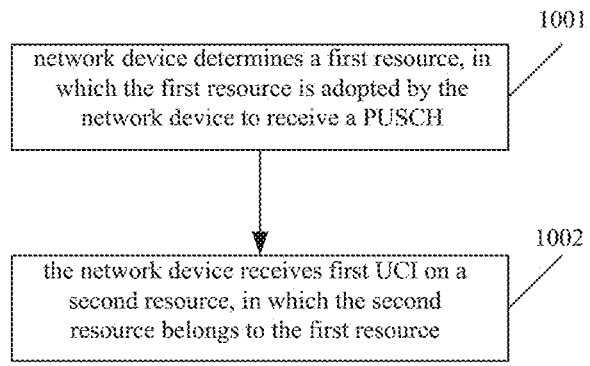
FIG. 10 is a flowchart illustrating a method for transmitting the UCI, in accordance with a second embodiment of the application.

FIG. 10 is a schematic diagram illustrating a method for transmitting UCI, in accordance with a second embodiment of the application. The specific blocks are as follows.

In block 1001, a network device determines a first resource, in which the first resource is adopted by the network device to receive a PUSCH.

The first resource includes $N_{RB}^{PUSCH}$ RBs in the frequency domain.

In block 1002, the network device receives first UCI on a second resource, in which the second resource belongs to the first resource.

The second resource includes $N_{RE}^{UCI}$ REs. The $N_{RE}^{UCI}$ REs include $N_{RE\_SET}^{UCI}$ RE sets and $N_{RE\_SEP}^{UCI}$ REs. Each of the $N_{RE\_SET}^{UCI}$ RE sets includes $N_{RB}^{PUSCH}$ REs. Among the $N_{RB}^{PUSCH}$ REs, REs with adjacent frequencies are separated by $N_{SC}^{RB}$ subcarriers.

$N_{RE}^{UCI}$, $N_{RE\_SET}^{UCI}$ and $N_{RE\_SEP}^{UCI}$ are all integers not less than 0. $N_{RE\_SEP}^{UCI} < N_{RB}^{PUSCH}$. $N_{RB}^{PUSCH}$ is an integer greater than 0. $N_{SC}^{RB}$ is the number of subcarriers included by one RB in the frequency domain.

Among the $N_{RE\_SEP}^{UCI}$ REs, REs with adjacent frequencies are separated by $N_{SC}^{RB}$ subcarriers.

The second resource belongs to a second symbol set in the time domain. The second symbol set and the first symbol set are adjacent in time. The first symbol set includes symbols for transmitting the DMRS by the user terminal in the first resource.

If the second symbol set includes P symbols, resources of first (P−1) symbols in the second symbol set of the first resource belong to the second resource.

Among the $N_{RE}^{UCI}$ REs, the position of the first RE with the minimum index value is preset, or is configured by the network device for the user terminal through first information. The first RE has the minimum frequency index in the first RE set. The first RE set includes REs with the minimum time index in the $N_{RE}^{UCI}$ RE sets; or, among the $N_{RE}^{UCI}$ REs, the position of the first RE with the minimum index value is determined by the position of the RE included by the third resource, in which the third resource is adopted by the user terminal to transmit the second UCI, and the third resource belongs to the first resource.

If $N_{RE\_SET}^{UCI} \geq 1$, the first RE belongs to the $N_{RE\_SET}^{UCI}$ RE sets.

The network device transmits second information, in which the second information is used to configure the user terminal, such that the user terminal is not allowed to simultaneously transmit the PUSCH and the PUCCH.

Before transmitting the first UCI on the second resource, the user terminal receives and configures the second information.

If $N_{RE}^{UCI} > N_{RB}^{PUSCH} \times N_{SC}^{RB}$, the $N_{RE\_SET}^{UCI}$ RE sets are located within $M_{symbol}^{UCI}$ symbols, in which, if $$\mod\left(\frac{N_{RE}^{UCI}}{N_{RB}^{PUSCH} \times N_{SC}^{RB}}\right) = 0, M_{symbol}^{UCI} = \text{Quotient}\left(\frac{N_{RE}^{UCI}}{N_{RB}^{PUSCH} \times N_{SC}^{RB}}\right).$$

If $$\mod\left(\frac{N_{RE}^{UCI}}{N_{RB}^{PUSCH} \times N_{SC}^{RB}}\right) \neq 0, M_{symbol}^{UCI} = \text{Quotient}\left(\frac{N_{RE}^{UCI}}{N_{RB}^{PUSCH} \times N_{SC}^{RB}}\right) + 1.$$

In the foregoing formula, Quotient denotes the operation to take the quotient, mod denotes the operation to take the remainder, $M_{symbol}^{UCI}$ symbols are consecutive in the time domain.

If the second resource includes $N_{RE\_SET\,j}^{UCI}$ RE sets on symbol j, the $N_{RE\_SET\,j}^{UCI}$ RE sets include $N_{RE\_SET\,j}^{UCI}$ REs in one RB of symbol j. The $N_{RE\_SET\,j}^{UCI}$ REs are consecutive in frequency.

Optionally, the $N_{RE\_SET\,j}^{UCI}$ REs have the lowest frequency index in the RB, or have the highest frequency index in the RB.

Alternatively and optionally, the frequency sorting position of the $N_{RE\_SET\,j}^{UCI}$ REs in one RB and the value of $N_{RE\_SET\,j}^{UCI}$ meet a preset relationship. The frequency sorting position of the RE in the RB refers to that, according to the ascending order or descending order of frequency, a corresponding RE is located in which RE of the RB. For example, the preset relationship includes:

when $N_{RE\_SET\,j}^{UCI}=1$, the frequency sorting position of the $N_{RE\_SET\,j}^{UCI}$ RE in one RB is {0};

when $N_{RE\_SET\,j}^{UCI}=2$, the frequency sorting position of the $N_{RE\_SET\,j}^{UCI}$ REs in one RB is {0, 6};

when $N_{RE\_SET\,j}^{UCI}=3$, the frequency sorting position of the $N_{RE\_SET\,j}^{UCI}$ REs in one RB is {0, 4, 8};

when $N_{RE\_SET\,j}^{UCI}=4$, the frequency sorting position of the $N_{RE\_SET\,j}^{UCI}$ REs in one RB is {0, 3, 6, 9};

when $N_{RE\_SET\,j}^{UCI}=6$, the frequency sorting position of the $N_{RE\_SET\,j}^{UCI}$ REs in one RB is {0, 2, 4, 6, 8, 10};

when $N_{RE\_SET\,j}^{UCI}=12$, the frequency sorting position of the $N_{RE\_SET\,j}^{UCI}$ REs in one RB is {0, 1, 2, 3, 4, 5, 6, 7, 8, 9, 10, 11}.

If the first UCI includes two kinds, or more than two kinds of control information, the user terminal determines the mapping resources of various kinds of control information in the second resource, based on a descending order of UCI priority sequence. The resources mapping to the first control information in the second resource are determined, by the resources mapping to the second control information in the second resource, in which priority sequence of the second control information is higher than that of the first control information. The priority sequence includes as follows. The priority of the HARQ-ACK is higher than that of the first-type CSI, and the priority of the first-type CSI is higher than that of the second-type CSI.

The size of the second-type CSI is determined by the value of the first-type CSI. The second-type CSI includes CQI, RI, and so on. The first-type CSI includes the RI. According to a different RI value in the first-type CSI, the size of the second-type CSI is different. That is, the second-type CSI has a different bit length. When RI=1, the second-type CSI includes $W_1$ bits. When RI=2, the second-type CSI includes $W_2$ bits.

With reference to the understanding of foregoing related technical features on the network device side, please refer to the technical features corresponding to the user terminal side, which is not repeated here.

Figure 11:
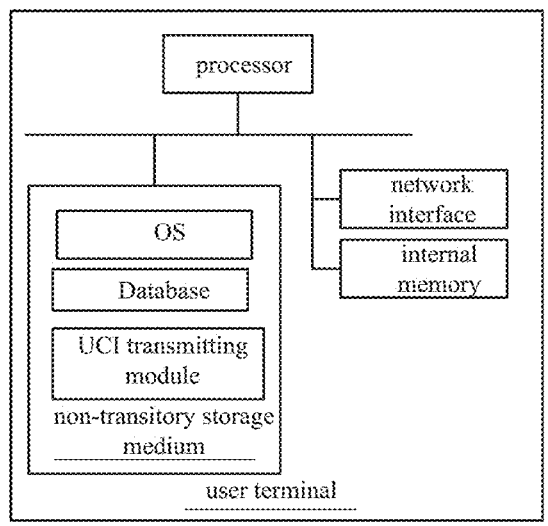
FIG. 11 is a schematic diagram illustrating an internal structure of a user terminal, in accordance with an embodiment.

FIG. 11 is a schematic diagram illustrating an internal structure of a user terminal (or a UCI transmission device applied to the terminal) in an embodiment. As shown in FIG. 11, the terminal includes a processor, a non-transitory storage medium, an internal memory and a network interface coupled with each other through a system bus. The non-transitory storage medium of the terminal stores an Operating System (OS), a database and an instruction module (i.e., an instruction module for performing a UCI transmission method) in the UCI transmission device applied to the terminal. The database may include a configured first resource database and a second resource database. The instruction module in the UCI transmission device is configured to implement a UCI transmission method applied to the terminal. The processor of the terminal is configured to provide computing and control capabilities, so as to support the operation of the entire terminal. The internal memory of the terminal provides an environment for the running of the instruction module, in which the instruction module is located in the UCI transmission device of the non-transitory storage medium. The internal memory may store computer readable instructions, when being executed by the processor, the processor is caused to perform the UCI transmission method. The network interface of the terminal is configured to communicate with external network devices through a network connection, i.e, transmit the PUSCH to the network device. Persons having ordinary skill in the art may understand that, the structure shown in FIG. 11 is only a block diagram of part of the structure related to the solution of the application, and does not constitute a limitation on the terminal to which the solution of this application is applied. A specific terminal may include more or less components than shown in the figure, or combine certain components, or have different component arrangements.

Figure 12:
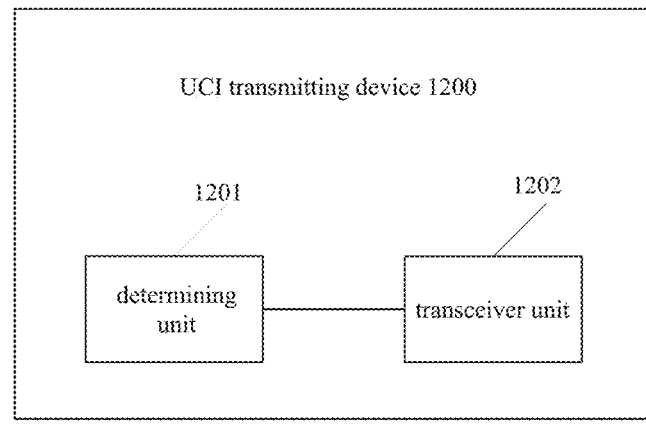
FIG. 12 is a schematic diagram illustrating structure of an instruction module in a device 1200 for transmitting the UCI, in accordance with an embodiment.

FIG. 12 is a schematic diagram illustrating structure of an instruction module in a UCI transmission device 1200 (i.e., a user terminal), in an embodiment. The UCI transmission device 1200 includes:

one or more memories (i.e., the non-transitory storage medium in FIG. 11);
one or more processors;
in which the one or more memories store one or more instruction modules,
which are executed by the one or more processors after being configured.

With reference to FIG. 12, the one or more instruction modules include: a determining unit 1201, configured to determine a first resource, in which the first resource is adopted by the user terminal to transmit a PUSCH, and the first resource includes $N_{RB}^{PUSCH}$ RBs in the frequency domain; and, a transceiver unit 1202, configured to transmit first UCI on a second resource, in which the second resource belongs to the first resource, the second resource includes $N_{RE}^{UCI}$ REs, the $N_{RE}^{UCI}$ REs include $N_{RE\_SET}^{UCI}$ RE sets and $N_{RE\_SEP}^{UCI}$ REs, each of the $N_{RE\_SET}^{UCI}$ RE sets includes $N_{RB}^{PUSCH}$ REs, and REs with adjacent frequencies among the $N_{RB}^{PUSCH}$ REs are separated by $N_{SC}^{RB}$ subcarriers, in which, $N_{RE\_SET}^{UCI}$ and $N_{RE\_SEP}^{UCI}$ SE are both integers not less than 0, $N_{RE\_SEP}^{UCI} < N_{RB}^{PUSCH}$, $N_{RE}^{UCI}$ and $N_{RB}^{PUSCH}$ are both integers greater than 0; and, $N_{SC}^{RB}$ is the number of subcarriers included by one RB in the frequency domain.

In another embodiment, REs with adjacent frequencies among the $N_{RE\_SEP}^{UCI}$ REs are separated by $N_{SC}^{RB}$ subcarriers.

In still another embodiment, the second resource is located in a second symbol set in the time domain. The second symbol set and the first symbol set are adjacent in time. The first symbol set includes symbols for transmitting a DMRS by the user terminal in the first resource.

In another embodiment, if the second symbol set includes P symbols, resources of first (P−1) symbols in the second symbol set of the first resource belong to the second resource.

In another embodiment, the position of the first RE with the minimum index value of the $N_{RE}^{UCI}$ REs is preset, or is configured by the network device for the user terminal through first information. The first RE has the minimum frequency index in the first RE set. The first RE set includes REs with the minimum time index in the $N_{RE}^{UCI}$ RE sets; or, the position of the first RE with the minimum index value in the $N_{RE}^{UCI}$ REs is determined by the position of the RE included by the third resource, in which the third resource is adopted by the user terminal to transmit second UCI, and the third resource belongs to the first resource.

In another embodiment, if $N_{RE\_SET}^{UCI} \geq 1$, the first RE belongs to the $N_{RE\_SET}^{UCI}$ RE sets.

In another embodiment, the transceiver unit 1202 is further configured to receive second information, before transmitting the first UCI on the second resource, in which the second information is used to configure the user terminal, such that the user terminal is not allowed to simultaneously transmit the PUSCH and the PUCCH.

In another embodiment, if $N_{RE}^{UCI} > N_{RB}^{PUSCH} \times N_{SC}^{RB}$, the $N_{RE\_SET}^{UCI}$ RE sets are located within $M_{symbol}^{UCI}$ symbols, in which, if $$\mathrm{mod}\left(\frac{N_{RE}^{UCI}}{N_{RB}^{PUSCH} \times N_{SC}^{RB}}\right) = 0,\ M_{symbol}^{UCI} = \mathrm{Quotient}\left(\frac{N_{RE}^{UCI}}{N_{RB}^{PUSCH} \times N_{SC}^{RB}}\right).$$

If $$\mathrm{mod}\left(\frac{N_{RE}^{UCI}}{N_{RB}^{PUSCH} \times N_{SC}^{RB}}\right) \neq 0,\ M_{symbol}^{UCI} = \mathrm{Quotient}\left(\frac{N_{RE}^{UCI}}{N_{RB}^{PUSCH} \times N_{SC}^{RB}}\right) + 1.$$

In the foregoing formula, "Quotient" denotes the operation to take the quotient, "mod" denotes the operation to take the remainder, and $M_{symbol}^{UCI}$ symbols are consecutive in the time domain.

In another embodiment, if the second resource includes $N_{RE\_SET\_j}^{UCI}$ RE sets on symbol j, the $N_{RE\_SET\_j}^{UCI}$ RE sets include $N_{RE\_SET\_j}^{UCI}$ REs within one RB of the symbol j. The $N_{RE\_SET\_j}^{UCI}$ REs are consecutive in frequency.

Optionally, the $N_{RE\_SET\_j}^{UCI}$ REs have the lowest frequency index in the RB, or have the highest frequency index in the RB.

Alternatively and optionally, frequency sorting position of $N_{RE\_SET_j}^{UCI}$ REs in one RB and a value of $N_{RE\_SET_j}^{UCI}$ meet a preset relationship. The frequency sorting position of the RE in the RB refers to that, according to the ascending order or descending order of frequency, a corresponding RE is located in which RE of the RB. For example, the preset relationship includes:

when $N_{RE\_SET_j}^{UCI}=1$, the frequency sorting position of $N_{RE\_SET_j}^{UCI}$ RE in one RB is {0};

when $N_{RE\_SET_j}^{UCI}=2$, the frequency sorting position of $N_{RE\_SET_j}^{UCI}$ REs in one RB is {0, 6};

when $N_{RE\_SET_j}^{UCI}=3$, the frequency sorting position of $N_{RE\_SET_j}^{UCI}$ REs in one RB is {0, 4, 8};

when $N_{RE\_SET_j}^{UCI}=4$, the frequency sorting position of $N_{RE\_SET_j}^{UCI}$ REs in one RB is {0, 3, 6, 9};

when $N_{RE\_SET_j}^{UCI}=6$, the frequency sorting position of $N_{RE\_SET_j}^{UCI}$ REs in one RB is {0, 2, 4, 6, 8, 10};

when $N_{RE\_SET_j}^{UCI}=12$, the frequency sorting position of $N_{RE\_SET_j}^{UCI}$ REs in one RB is {0, 1, 2, 3, 4, 5, 6, 7, 8, 9, 10, 11}.

In another embodiment, if the first UCI includes two kinds, or more than two kinds of control information, the user terminal determines the mapping resources of various kinds of control information in the second resource, based on a descending order of UCI priority sequence. The resources mapping to the first control information in the second resource are determined, by the resources mapping to the second control information in the second resource, in which priority sequence of the second control information is higher than that of the first control information. The priority sequence includes as follows. The priority of the HARQ-ACK is higher than that of the first-type CSI, and the priority of the first-type CSI is higher than that of the second-type CSI.

The size of the second-type CSI is determined by the value of the first-type CSI. The second-type CSI includes CQI, RI, and so on. The first-type CSI includes the RI. According to a different RI value in the first-type CSI, the size of the second-type CSI is different. That is, the second-type CSI has a different bit length. When RI=1, the second-type CSI includes $W_1$ bits. When RI=2, the second-type CSI includes $W_2$ bits.

Figure 13:
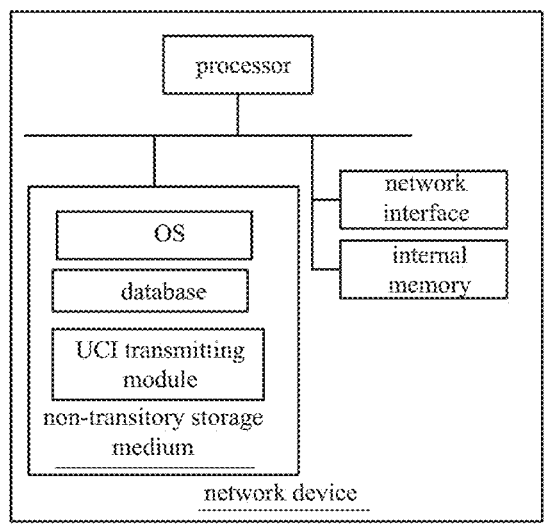
FIG. 13 is a schematic diagram illustrating an internal structure of a network device, in accordance with an embodiment.

FIG. 13 is a schematic diagram illustrating an internal structure of a network device (or a UCI transmission device) in an embodiment. As shown in FIG. 13, the network device includes a processor, a non-transitory storage medium, an internal memory and a network interface coupled with each other through a system bus. The non-transitory storage medium of the network device stores an OS, a database and an instruction module (i.e., an instruction module for executing a UCI transmission method) of the UCI transmission device. The database may include a configured first resource database and a second resource database. The instruction module in the UCI transmission device is configured to implement the UCI transmission method applied to the network device. The processor of the network device is configured to provide computing and control capabilities, and support the operation of the entire network device. The internal memory of the network device provides a running environment for the instruction module, in which the instruction module is in the UCI transmission device of the non-transitory storage medium. The internal memory stores computer readable instructions, when being executed by the processor, the processor is caused to execute the UCI transmission method. The network interface of the network device is configured to communicate with an external user terminal through a network connection, i.e., receive a PUSCH from the user terminal. The network device may be implemented by using an independent network device, or a network device cluster including multiple network devices. Persons having ordinary skill in the art may understand that, the structure shown in FIG. 13 is only a block diagram about part of structure related with the solution of the application, which does not constitute a limitation on the network device to which the solution of this application is applied. A specific network device may include more or less components than shown in the figure, or combine certain components, or have different component arrangements.

Figure 14:
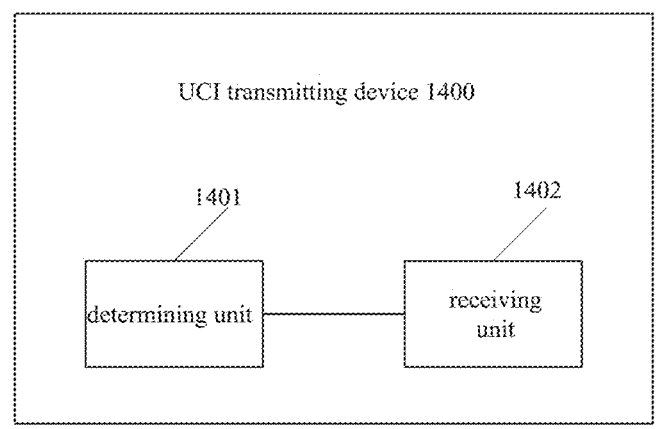
FIG. 14 is a schematic diagram illustrating structure of an instruction module in a device 1400 for transmitting the UCI, in accordance with an embodiment.

FIG. 14 is a schematic diagram illustrating structure of an instruction module of a UCI transmission device 1400 (i.e., a network device) in an embodiment. The UCI transmission device 1400 includes: one or more memories (i.e., the non-transitory storage medium in FIG. 13); one or more processors; and, the one or more memories store one or more instruction modules, which are executed by the one or more processors, after being configured.

With reference to FIG. 14, the one or more instruction modules include: a determining unit 1401, configured to determine a first resource, in which the first resource is adopted by the network device to receive a PUSCH, and the first resource includes $N_{RB}^{PUSCH}$ RBs in the frequency domain; and, a receiving unit 1402, configured to receive first UCI on a second resource, in which the second resource belongs to the first resource, the second resource includes $N_{RE}^{UCI}$ REs, the $N_{RE}^{UCI}$ REs include $N_{RE\_SET}^{UCI}$ RE sets and $N_{RE\_SEP}^{UCI}$ REs, each of the $N_{RE\_SET}^{UCI}$ RE sets includes $N_{RB}^{PUSCH}$ REs, and REs with adjacent frequencies of $N_{RB}^{PUSCH}$ REs are separated by $N_{SC}^{RB}$ subcarriers, in which, $N_{RE}^{UCI}$, $N_{RE\_SET}^{UCI}$, and $N_{RE\_SEP}^{UCI}$ are all integers not less than 0. $N_{RE\_SEP}^{UCI}<N_{RB}^{PUSCH}$. $N_{RB}^{PUSCH}$ is an integer greater than 0. $N_{SC}^{RB}$ is the number of subcarriers included by one RB in the frequency domain.

In another embodiment, REs with adjacent frequencies of $N_{RE\_SEP}^{UCI}$ REs are separated by $N_{SC}^{RB}$ subcarriers.

In another embodiment, the second resource belongs to a second symbol set in the time domain. The second symbol set and the first symbol set are adjacent in time. The first symbol set includes symbols for transmitting a DMRS by a user terminal in the first resource.

In another embodiment, if the second symbol set includes P symbols, resources of first (P−1) symbols in the second symbol set of the first resource belong to the second resource.

In another embodiment, the position of the first RE with the minimum index value of $N_{RE}^{UCI}$ REs is preset, or is configured by the network device for the user terminal through first information. The first RE has the minimum frequency index in the first RE set. The first RE set includes REs with the minimum time index in the $N_{RE}^{UCI}$ RE sets; or, the position of the first RE with the minimum index value of $N_{RE}^{UCI}$ REs is determined by the position of the RE included by a third resource, in which the third resource is adopted by the user terminal to transmit second UCI, and the third resource belongs to the first resource.

In another embodiment, if $N_{RE\_SET}^{UCI} \geq 1$, the first RE belongs to the $N_{RE\_SET}^{UCI}$ RE sets. If $N_{RE}^{UCI} > N_{RB}^{PUSCH} \times N_{SC}^{RB}$, the $N_{RE\_SET}^{UCI}$ RE sets are located within $M_{symbol}^{UCI}$ symbols. If $$\mod\left(\frac{N_{RE}^{UCI}}{N_{RB}^{PUSCH} \times N_{SC}^{RB}}\right) = 0, M_{symbol}^{UCI} = \text{Quotient}\left(\frac{N_{RE}^{UCI}}{N_{RB}^{PUSCH} \times N_{SC}^{RB}}\right);$$

if $$\mod\left(\frac{N_{RE}^{UCI}}{N_{RB}^{PUSCH} \times N_{SC}^{RB}}\right) \neq 0, M_{symbol}^{UCI} = \text{Quotient}\left(\frac{N_{RE}^{UCI}}{N_{RB}^{PUSCH} \times N_{SC}^{RB}}\right) + 1.$$

In the foregoing formula, Quotient denotes the operation to take the quotient, mod denotes the operation to take the remainder, and $M_{symbols}^{UCI}$ symbols are consecutive in the time domain.

In another embodiment, if the second resource includes $N_{RE\ SET\ j}^{UCI}$ RE sets on symbol j, the $N_{RE\ SET\ j}^{UCI}$ RE sets include $N_{RE\ SET\ j}^{UCI}$ REs in one RB of symbol j. The $N_{RE\ SET\ j}^{UCI}$ REs are consecutive in frequency.

Optionally, the $N_{RE\ SET\ j}^{UCI}$ REs have the lowest frequency index in the RB, or have the highest frequency index in the RB.

Alternatively and optionally, the frequency sorting position of the $N_{RE\ SET\ j}^{UCI}$ REs in one RB and a value of $N_{RE\ SET\ j}^{UCI}$ meet a preset relationship. The frequency sorting position of the RE in the RB refers to that, according to the ascending order or descending order of frequency, a corresponding RE is located in which RE of the RB. For example, the preset relationship includes:

when $N_{RE\ SET\ j}^{UCI}=1$, the frequency sorting position of $N_{RE\ SET\ j}^{UCI}$ RE in one RB is {0};

when $N_{RE\ SET\ j}^{UCI}=2$, the frequency sorting position of $N_{RE\ SET\ j}^{UCI}$ REs in one RB is {0, 6};

when $N_{RE\ SET\ j}^{UCI}=3$, the frequency sorting position of $N_{RE\ SET\ j}^{UCI}$ REs in one RB is {0, 4, 8};

when $N_{RE\ SET\ j}^{UCI}=4$, the frequency sorting position of $N_{RE\ SET\ j}^{UCI}$ REs in one RB is {0, 3, 6, 9};

when $N_{RE\ SET\ j}^{UCI}=6$, the frequency sorting position of $N_{RE\ SET\ j}^{UCI}$ REs in one RB is {0, 2, 4, 6, 8, 10};

when $N_{RE\ SET\ j}^{UCI}=12$, the frequency sorting position of $N_{RE\ SET\ j}^{UCI}$ REs in one RB is {0, 1, 2, 3, 4, 5, 6, 7, 8, 9, 10, 11}.

In another embodiment, if the first UCI includes two kinds, or more than two kinds of control information, the user terminal determines the mapping resources of various kinds of control information in the second resource, based on a descending order of UCI priority sequence. The resources mapping to the first control information in the second resource are determined, by the resources mapping to the second control information in the second resource, in which priority sequence of the second control information is higher than that of the first control information. The priority sequence includes as follows. The priority of the HARQ-ACK is higher than that of the first-type CSI, and the priority of the first-type CSI is higher than that of the second-type CSI.

The size of the second-type CSI is determined by the value of the first-type CSI. The second-type CSI includes CQI, RI, and so on. The first-type CSI includes the RI. According to a different RI value in the first-type CSI, the size of the second-type CSI is different. That is, the second-type CSI has a different bit length. When RI=1, the second-type CSI includes $W_1$ bits. When RI=2, the second-type CSI includes $W_2$ bits.

An embodiment of the application also provides a non-transitory storage medium, which stores computer readable instructions. The computer readable instructions may enable at least one processor to perform the method in the first embodiment.

An embodiment of the application also provides a non-transitory storage medium, which stores computer readable instructions. The computer readable instructions may enable at least one processor to perform the method in the second embodiment.

Figure 15:
FIG. 15 is a schematic diagram illustrating a system for applying foregoing technology, in accordance with an embodiment of the application.

Based on the same concept, the application also provides a UCI transmission system. With reference to FIG. 15, FIG. 15 is a schematic diagram illustrating a system for applying foregoing technology, in accordance with an embodiment of the application. The system includes a user terminal and a network device.

The user terminal is configured to determine a first resource, in which the first resource is adopted by the user terminal to transmit a PUSCH, the first resource includes $N_{RB}^{PUSCH}$ RBs in the frequency domain; the user terminal is further configured to transmit first UCI on a second resource, in which the second resource belongs to the first resource.

The network device is configured to determine the first resource, in which the first resource is adopted by the network device to receive the PUSCH, the first resource includes $N_{RB}^{PUSCH}$ RBs in the frequency domain; the network device is further configured to receive the first UCI on the second resource, in which the second resource belongs to the first resource.

The second resource includes $N_{RE}^{UCI}$ REs. The $N_{RE}^{UCI}$ REs include $N_{RE\ SET}^{UCI}$ RE sets and $N_{RE\ SEP}^{UCI}$ REs. Each of the $N_{RE\ SET}^{UCI}$ RE sets includes $N_{RB}^{PUSCH}$ REs, and REs with adjacent frequencies of the $N_{RB}^{PUSCH}$ REs are separated by $N_{SC}^{RB}$ subcarriers.

$N_{RE}^{UCI}$, $N_{RE\ SET}^{UCI}$ and $N_{RE\ SEP}^{UCI}$ are all integers not less than 0. $N_{RE\ SEP}^{UCI} < N_{RB}^{PUSCH}$. $N_{RB}^{PUSCH}$ is an integer greater than 0. $N_{SC}^{RB}$ is the number of subcarriers included by one RB in the frequency domain.

Regarding the specific implementations of the user terminal and network device in the system, refer to the user terminal in the first embodiment and the network device in the second embodiment, and the network device may be a base station, which is not repeated here.

In view of above, in the application, the position for transmitting UCI on the PUSCH resource is respectively given in the frequency domain and the time domain. By adopting the solution of the application, performance and delay requirements for transmitting UCI information on the PUSCH resource are improved.

Various technical features of foregoing embodiments may be arbitrarily combined, to simplify the description, not all the possible combinations of various technical features of foregoing embodiments are described. However, as long as there is no contradiction in the combination of these technical features, they should be considered as within the scope of the specification.

Foregoing embodiments only describe several implementations of the application, descriptions thereof are specific and detailed, however, they should not be understood as a limitation to the scope of the application. It should be pointed out that, for persons having ordinary skill in the art, without departing from the concept of the application, several modifications and improvements may be made, which belong to the protection scope of the application. Thus, the protection scope of the application should be determined by the attached claims.

What is claimed is:

1. A method for transmitting Uplink Control Information (UCI), comprising:
   determining, by a user terminal, a first resource, wherein the first resource is adopted by the user terminal to transmit a Physical Uplink Shared Channel (PUSCH), and the first resource comprises $N_{RB}^{PUSCH}$ Resource Blocks (RBs);

transmitting, by the user terminal, first UCI on a second resource, wherein the second resource is a subset of the first resource, the second resource comprises $N_{RE}^{UCI}$ Resource Elements (REs), the $N_{RE}^{UCI}$ REs are composed of $N_{RE\_SET}^{UCI}$ RE sets and $N_{RE\_SEP}^{UCI}$ REs, each of the $N_{RE\_SET}^{UCI}$ RE sets comprises $N_{RB}^{PUSCH}$ REs, and REs with adjacent frequencies of the $N_{RB}^{PUSCH}$ REs are separated by $N_{SC}^{RB}$ subcarriers;

wherein $N_{RE\_SET}^{UCI}$ represents a number of RE sets for transmitting the first UCI, $N_{RE\_SEP}^{UCI}$ represents a number of REs in addition to the $N_{RE\_SET}^{UCI}$ RE sets for transmitting the first UCI, $N_{RE\_SET}^{UCI}$ and $N_{RE\_SEP}^{UCI}$ are integers not less than 0, $N_{RE\_SEP}^{UCI} < N_{RB}^{PUSCH}$, $N_{RE}^{UCI}$ and $N_{RB}^{PUSCH}$ are integers greater than 0, $N_{SC}^{RB}$ is a number of subcarriers in one RB of the frequency domain;

when the second resource comprises $N_{RE\_SET\_j}^{UCI}$ RE sets on symbol j, the $N_{RE\_SET\_j}^{UCI}$ RE sets comprise $N_{RE\_SET\_j}^{UCI}$ REs in one RB of symbol j, a frequency sorting position of the $N_{RE\_SET\_j}^{UCI}$ REs and a value of $N_{RE\_SET\_j}^{UCI}$ meet a preset relationship, and the preset relationship comprises:

when $N_{RE\_SET\_j}^{UCI} = 1$, the frequency sorting position of the $N_{RE\_SET\_j}^{UCI}$ RE in one RB is $\{0\}$;

when $N_{RE\_SET\_j}^{UCI} = 2$, the frequency sorting position of the $N_{RE\_SET\_j}^{UCI}$ REs in one RB is $\{0,6\}$;

when $N_{RE\_SET\_j}^{UCI} = 3$, the frequency sorting position of the $N_{RE\_SET\_j}^{UCI}$ REs in one RB is $\{0, 4, 8\}$;

when $N_{RE\_SET\_j}^{UCI} = 4$, the frequency sorting position of the $N_{RE\_SET\_j}^{UCI}$ REs in one RB is $\{0, 3, 6, 9\}$;

when $N_{RE\_SET\_j}^{UCI} = 6$, the frequency sorting position of the $N_{RE\_SET\_j}^{UCI}$ REs in one RB is $\{0, 2, 4, 6, 8, 10\}$;

when $N_{RE\_SET\_j}^{UCI} = 12$, the frequency sorting position of the $N_{RE\_SET\_j}^{UCI}$ REs in one RB is $\{0, 1, 2, 3, 4, 5, 6, 7, 8, 9, 10, 11\}$.

2. The method according to claim 1, wherein REs with adjacent frequencies in the $N_{RE\_SEP}^{UCI}$ REs are separated by $N_{SC}^{RB}$ subcarriers.

3. The method according to claim 1, wherein the second resource is in a second symbol set of a time domain, the second symbol set and a first symbol set are adjacent in time, and the first symbol set comprises symbols for transmitting a Demodulation Reference Signal (DMRS) by the user terminal in the first resource.

4. The method according to claim 3, wherein when the second symbol set comprises P symbols, resources of first (P−1) symbols in the second symbol set of the first resource belong to the second resource.

5. The method according to claim 1, wherein a position of a first RE with the minimum index value of the $N_{RE}^{UCI}$ REs is preset, or is configured by a network device for the user terminal through first information, the first RE has the minimum frequency index in a first RE set, and the first RE set comprises REs with the minimum time index of the $N_{RE}^{UCI}$ RE sets; or, wherein the position of the first RE with the minimum index value of the $N_{RE}^{UCI}$ REs is determined by a position of an RE included by a third resource, the third resource is adopted by the user terminal to transmit second UCI, and the third resource belongs to the first resource.

6. The method according to claim 5, wherein when $N_{RE\_SET}^{UCI} \geq 1$, the first RE belongs to the $N_{RE\_SET}^{UCI}$ RE sets.

7. The method according to any of claims 1 to 6, further comprising:

before transmitting the first UCI on the second resource, receiving, by the user terminal, second information, wherein the second information is configured to set the user terminal, such that the user terminal is not allowed to simultaneously transmit the PUSCH and a Physical Uplink Control Channel (PUCCH).

8. The method according to claim 1, wherein when $N_{RE}^{UCI} > N_{RB}^{PUSCH} \times N_{SC}^{RB}$, the $N_{RE\_SET}^{UCI}$ RE sets are located within $M_{symbol}^{UCI}$ symbols;

when $$\mod\left(\frac{N_{RE}^{UCI}}{N_{RB}^{PUSCH} \times N_{SC}^{RB}}\right) = 0, M_{symbol}^{UCI} = \text{Quotient}\left(\frac{N_{RE}^{UCI}}{N_{RB}^{PUSCH} \times N_{SC}^{RB}}\right);$$

when $$\mod\left(\frac{N_{RE}^{UCI}}{N_{RB}^{PUSCH} \times N_{SC}^{RB}}\right) \neq 0, M_{symbol}^{UCI} = \text{Quotient}\left(\frac{N_{RE}^{UCI}}{N_{RB}^{PUSCH} \times N_{SC}^{RB}}\right) + 1;$$

wherein Quotient denotes an operation to take a quotient, mod denotes an operation to take a remainder, the $M_{symbol}^{UCI}$ symbols are consecutive in a time domain.

9. A method for receiving Uplink Control Information (UCI), comprising:

determining, by a network device, a first resource, wherein the first resource is adopted by the network device to receive a Physical Uplink Shared Channel (PUSCH), and the first resource in a frequency domain comprises $N_{RB}^{PUSCH}$ Resource Blocks (RBs);

receiving, by the network device, first UCI on a second resource, wherein the second resource is a subset of the first resource, wherein second resource comprises $N_{RE}^{UCI}$ Resource Elements (REs), the $N_{RE}^{UCI}$ REs are composed of $N_{RE\_SET}^{UCI}$ RE sets and $N_{RE\_SEP}^{UCI}$ REs, each of the $N_{RE\_SET}^{UCI}$ RE sets comprises $N_{RB}^{PUSCH}$ REs, and REs with adjacent frequencies of the $N_{RB}^{PUSCH}$ REs are separated by $N_{SC}^{RB}$ subcarriers; $N_{RE\_SET}^{UCI}$ represents a number of RE sets for transmitting the first UCI, $N_{RE\_SEP}^{UCI}$ represents a number of REs in addition to the $N_{RE\_SET}^{UCI}$ RE sets for transmitting the first UCI, $N_{RE\_SET}^{UCI}$ and $N_{RE\_SEP}^{UCI}$ are integers not less than 0, $N_{RE\_SET}^{UCI} < N_{RU}^{PUSCH}$, $N_{RB}^{PUSCH}$ is an integers greater than 0, $N_{SC}^{RB}$ is a number of subcarriers included by one RB of the frequency domain;

when the second resource comprises $N_{RE\_SET\_j}^{UCI}$ RE sets on symbol j, the $N_{RE\_SET\_j}^{UCI}$ RE sets comprise $N_{RE\_SET\_j}^{UCI}$ REs in one RB of symbol j, a frequency sorting position of the $N_{RE\_SET\_j}^{UCI}$ REs and a value of $N_{RE\_SET\_j}^{UCI}$ meet a preset relationship, and the preset relationship comprises:

when $N_{RE\_SET\_j}^{UCI} = 1$, the frequency sorting position of the $N_{RE\_SET\_j}^{UCI}$ RE in one RB is $\{0\}$;

when $N_{RE\_SET\_j}^{UCI} = 2$, the frequency sorting position of the $N_{RE\_SET\_j}^{UCI}$ REs in one RB is $\{0,6\}$;

when $N_{RE\_SET\_j}^{UCI} = 2$, the frequency sorting position of the $N_{RE\_SET\_j}^{UCI}$ REs in one RB is $\{0, 4, 8\}$;

when $N_{RE\_SET\_j}^{UCI} = 4$, the frequency sorting position of the $N_{RE\_SET\_j}^{UCI}$ REs in one RB is $\{0, 3, 6, 9\}$;

when $N_{RE\_SET\_j}^{UCI} = 6$, the frequency sorting position of the $N_{RE\_SET\_j}^{UCI}$ REs in one RB is $\{0, 2, 4, 6, 8, 10\}$;

when $N_{RE\_SET\_j}^{UCI} = 12$, the frequency sorting position of the $N_{RE\_SET\_j}^{UCI}$ REs in one RB is $\{0, 1, 2, 3, 4, 5, 6, 7, 8, 9, 10, 11\}$.

10. A device for transmitting Uplink Control Information (UCI), applied to a user terminal, comprising:
  one or more memories;
  one or more processors;
  wherein the one or more memories store one or more instruction modules, which are executed by the one or more processors after being configured, and
  the one or more instruction modules comprise:
  a determining unit, configured to determine a first resource, wherein the first resource is adopted by a user terminal to transmit a Physical Uplink Shared Channel (PUSCH), and the first resource comprises $N_{RB}^{PUSCH}$ Resource Blocks (RBs) in a frequency domain; and,
  a transceiver unit, configured to transmit first UCI on a second resource, wherein the second resource belongs to the first resource, the second resource comprises $N_{RE}^{UCI}$ Resource Elements (REs), the $N_{RE}^{UCI}$ REs are composed of $N_{RE\_SET}^{UCI}$ RE sets and $N_{RE\_SEP}^{UCI}$ REs, each of the $N_{RE\_SET}^{UCI}$ RE sets comprises $N_{RB}^{PUSCH}$ REs, and REs with adjacent frequencies of the $N_{RB}^{PUSCH}$ REs are separated by $N_{SC}^{RB}$ subcarriers;
  wherein $N_{RE\_SET}^{UCI}$ represents a number of RE sets for transmitting the first UCI, $N_{RE\_SEP}^{UCI}$ represents a number of REs in addition to the $N_{RE\_SET}^{UCI}$ RE sets for transmitting the first UCI, $N_{RE\_SET}^{UCI}$ and $N_{RE\_SEP}^{UCI}$ are integers not less than 0, $N_{RE\_SET}^{UCI} < N_{RU}^{PUSCH}$, $N_{RE}^{UCI}$ and $N_{RB}^{PUSCH}$ are integers greater than 0, $N_{SC}^{RB}$ is a number of subcarriers in one RB of the frequency domain;
  when the second resource comprises $N_{RE\_SET\,j}^{UCI}$ RE sets on symbol j, the $N_{RE\_SET\,j}^{UCI}$ RE sets comprise $N_{RE\_SET\,j}^{UCI}$ REs in one RB of symbol j, a frequency sorting position of the $N_{RE\_SET\,j}^{UCI}$ REs and a value of $N_{RE\_SET\,j}^{UCI}$ meet a preset relationship, and the preset relationship comprises:
  when $N_{RE\_SET\,j}^{UCI}=1$, the frequency sorting position of the $N_{RE\_SET\,j}^{UCI}$ RE in one RB is {0};
  when $N_{RE\_SET\,j}^{UCI}=2$, the frequency sorting position of the $N_{RE\_SET\,j}^{UCI}$ REs in one RB is {0,6};
  when $N_{RE\_SET\,j}^{UCI}=2$, the frequency sorting position of the $N_{RE\_SET\,j}^{UCI}$ REs in one RB is {0, 4, 8};
  when $N_{RE\_SET\,j}^{UCI}=4$, the frequency sorting position of the $N_{RE\_SET\,j}^{UCI}$ REs in one RB is {0, 3, 6, 9};
  when $N_{RE\_SET\,j}^{UCI}=6$, the frequency sorting position of the $N_{RE\_SET\,j}^{UCI}$ REs in one RB is {0, 2, 4, 6, 8, 10};
  when $N_{RE\_SET\,j}^{UCI}=12$, the frequency sorting position of the $N_{RE\_SET\,j}^{UCI}$ REs in one RB is {0, 1, 2, 3, 4, 5, 6, 7, 8, 9, 10, 11}.

11. The device according to claim 10, wherein REs with adjacent frequencies in the $N_{RE\_SEP}^{UCI}$ REs are separated by $N_{SC}^{RB}$ subcarriers.

12. The device according to claim 10, wherein the second resource is in a second symbol set of a time domain, the second symbol set and a first symbol set are adjacent in time, and the first symbol set comprises symbols for transmitting a Demodulation Reference Signal (DMRS) by the user terminal in the first resource.

13. The device according to claim 12, wherein when the second symbol set comprises P symbols, resources of first (P−1) symbols in the second symbol set of the first resource belong to the second resource.

14. The device according to claim 10, wherein a position of a first RE with the minimum index value of the $N_{RE}^{UCI}$ REs is preset, or is configured by a network device for the user terminal through first information, the first RE has the minimum frequency index in a first RE set, and the first RE set comprises REs with the minimum time index of the $N_{RE}^{UCI}$ RE sets; or,
  wherein the position of the first RE with the minimum index value of the $N_{RE}^{UCI}$ REs is determined by a position of an RE included by a third resource, the third resource is adopted by the user terminal to transmit second UCI, and the third resource belongs to the first resource.

15. The device according to claim 14, wherein when $N_{RE\_SET}^{UCI} \geq 1$, the first RE belongs to the $N_{RE\_SET}^{UCI}$ RE sets.

16. The device according to any of claim 10, wherein the transceiver unit is further configured to:
  before transmitting the first UCI on the second resource, receive second information, wherein the second information is configured to set the user terminal, such that the user terminal is not allowed to simultaneously transmit the PUSCH and a Physical Uplink Control Channel (PUCCH).

17. The device according to claim 12, wherein when $N_{RE}^{UCI} > N_{RB}^{PUSCH} \times N_{SC}^{RB}$, the $N_{RE\_SET}^{UCI}$ RE sets are located within $M_{symbol}^{UCI}$ symbols;
when $$\mod\left(\frac{N_{RE}^{UCI}}{N_{RB}^{PUSCH} \times N_{SC}^{RB}}\right) = 0, M_{symbol}^{UCI} = \text{Quotient}\left(\frac{N_{RE}^{UCI}}{N_{RB}^{PUSCH} \times N_{SC}^{RB}}\right);$$

when $$\mod\left(\frac{N_{RE}^{UCI}}{N_{RB}^{PUSCH} \times N_{SC}^{RB}}\right) \neq 0, M_{symbol}^{UCI} = \text{Quotient}\left(\frac{N_{RE}^{UCI}}{N_{RB}^{PUSCH} \times N_{SC}^{RB}}\right) + 1;$$

wherein Quotient denotes an operation to take a quotient, mod denotes an operation to take a remainder, the $M_{symbol}^{UCI}$ symbols are consecutive in a time domain.

* * * * *